United States Patent
Miura

(10) Patent No.: US 11,982,920 B2
(45) Date of Patent: May 14, 2024

(54) OPTICAL TRANSMISSION DEVICE

(71) Applicant: Mitsubishi Electric Corporation, Tokyo (JP)

(72) Inventor: Hiroshi Miura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 263 days.

(21) Appl. No.: 17/713,397

(22) Filed: Apr. 5, 2022

(65) Prior Publication Data
US 2022/0229341 A1 Jul. 21, 2022

Related U.S. Application Data

(63) Continuation of application No. PCT/JP2020/037937, filed on Oct. 7, 2020.

(30) Foreign Application Priority Data

Dec. 19, 2019 (WO) .................. PCT/JP2019/049890

(51) Int. Cl.
*G02F 1/225* (2006.01)
*G02F 1/21* (2006.01)

(52) U.S. Cl.
CPC .............. *G02F 1/225* (2013.01); *G02F 1/212* (2021.01)

(58) Field of Classification Search
CPC ....... G02F 1/225; G02F 1/212; H04B 10/079; H04B 10/516
See application file for complete search history.

(56) References Cited

U.S. PATENT DOCUMENTS

| | | | | |
|---|---|---|---|---|
| 8,676,060 B2 * | 3/2014 | Kawanishi | ............. | H04L 27/36 398/186 |
| 11,493,710 B2 * | 11/2022 | Maruyama | ............. | H04B 10/07 |

(Continued)

FOREIGN PATENT DOCUMENTS

| | | | | | |
|---|---|---|---|---|---|
| CN | 112272790 A | * | 1/2021 | ............. | G02F 1/212 |
| JP | 2010028741 A | * | 2/2010 | ......... | H04B 10/5057 |

(Continued)

OTHER PUBLICATIONS

WO-2020213123-A1 English Translation (Year: 2020).*

(Continued)

*Primary Examiner* — Michelle R Connelly
*Assistant Examiner* — Mary A El-Shammaa
(74) *Attorney, Agent, or Firm* — Birch, Stewart, Kolasch & Birch, LLP

(57) ABSTRACT

An optical transmission device includes: an IQ optical modulator to modulate incident light with a modulation signal, and adjust a phase of the modulated light with a phase bias, or adjust a phase of the incident light with the phase bias, and modulate the phase adjusted light with the modulation signal, a light intensity detector to detect light intensity of modulated light, a synchronous detection circuit to synchronously detect a light intensity signal and a dither signal, and a bias signal generating unit to monitor a change in amplitude of the modulation signal, generate the bias signal according to the synchronous detection signal when a range of the change is equal to or less than a first threshold, and generate a bias signal maintaining a phase bias before the range of the change becomes larger than the first threshold as the bias signal.

12 Claims, 13 Drawing Sheets

(56) References Cited

U.S. PATENT DOCUMENTS

| | | | |
|---|---|---|---|
| 11,507,818 B2* | 11/2022 | Hosseinzadeh | G06N 3/045 |
| 2009/0097843 A1* | 4/2009 | McBrien | H04B 10/505 |
| | | | 398/16 |
| 2018/0173023 A1* | 6/2018 | Streshinsky | G02F 1/2255 |
| 2018/0314127 A1* | 11/2018 | Fan | H04B 10/564 |
| 2018/0323878 A1* | 11/2018 | Kawakami | H04B 10/516 |
| 2021/0194594 A1 | 6/2021 | Kawakami et al. | |
| 2023/0080354 A1* | 3/2023 | Murakami | H04B 10/50575 |
| | | | 398/198 |
| 2023/0412274 A1* | 12/2023 | Nazarathy | G02F 7/00 |
| 2024/0019632 A1* | 1/2024 | Chen | G02F 1/2257 |

FOREIGN PATENT DOCUMENTS

| | | | | | |
|---|---|---|---|---|---|
| JP | 2016102870 A | * | 6/2016 | | H04B 10/0799 |
| JP | 2016149685 A | * | 8/2016 | | |
| JP | 6733912 B2 | * | 8/2020 | | G02B 6/4284 |
| WO | WO-2011030763 A1 | * | 3/2011 | | G02F 1/0123 |
| WO | WO-2013042284 A1 | * | 3/2013 | | H04B 10/516 |
| WO | WO-2013114628 A1 | * | 8/2013 | | G02F 1/0123 |
| WO | WO 2017/145981 A1 | | 8/2017 | | |
| WO | WO-2020213123 A1 | * | 10/2020 | | G02F 1/212 |
| WO | WO-2021124652 A1 | * | 6/2021 | | |

OTHER PUBLICATIONS

JP-2016102870-A English Translation (Year: 2016).*
CN-112272790-A English Translation (Year: 2013).*
JP-2010028741-A English Translation (Year: 2010).*
WO-2021124652-A1 English Translation (Year: 2021).*
WO-2011030763-A1 English Translation (Year: 2011).*
JP 2016149685 a English Translation (Year: 2016).*
WO-2013114628-A1 English Translation (Year: 2013).*

* cited by examiner ial Application No. PCT/JP2020/037937 filed on Oct. 7, 2020, which claims priority under 35 U.S.C. § 119(a) to PCT International Application No. PCT/JP2019/049890 filed in Japan on Dec. 19, 2019, all of which are hereby expressly incorporated by reference into the present application.

OPTICAL TRANSMISSION DEVICE

CROSS REFERENCE TO RELATED APPLICATIONS

This application is a Continuation of PCT International Application No. PCT/JP2020/037937 filed on Oct. 7, 2020, which claims priority under 35 U.S.C. § 119(a) to PCT International Application No. PCT/JP2019/049890 filed in Japan on Dec. 19, 2019, all of which are hereby expressly incorporated by reference into the present application.

TECHNICAL FIELD

The present disclosure relates to an optical transmission device including a quadrature optical modulator.

BACKGROUND ART

For example, Patent Literature 1 below discloses an optical transmitter including an optical modulator that modulates incident light using a drive signal, and an automatic bias control circuit that controls a phase bias of the optical modulator.

The automatic bias control circuit includes a photodetector that converts light output from the optical modulator into an electric signal, and a synchronous detection unit that performs synchronous detection of the electric signal and a dither signal.

In addition, the automatic bias control circuit includes a control unit that controls the phase bias of the optical modulator so that the result of the synchronous detection by the synchronous detection unit is zero.

CITATION LIST

Patent Literature

Patent Literature 1: WO 2017-145981 A

SUMMARY OF INVENTION

Technical Problem

In the optical transmitter disclosed in Patent Literature 1, a result of synchronous detection may become temporally discontinuous due to a situation in which a modulation format of a drive signal is changed during operation. When the result of the synchronous detection becomes temporally discontinuous, there is a problem that the phase bias by the control unit is controlled in a wrong direction, and the output signal of the optical modulator may be deteriorated.

The present disclosure has been made to solve the above problems, and an object of the present disclosure is to obtain an optical transmission device capable of suppressing deterioration of modulated light after phase adjustment by a quadrature optical modulator even when a result of synchronous detection becomes temporally discontinuous.

Solution to Problem

An optical transmission device according to the present disclosure includes: a quadrature optical modulator to modulate incident light with a modulation signal, adjust a phase of modulated light that is the light after the modulation with a phase bias indicated by a bias signal, and output the modulated light after the phase adjustment, or adjust a phase of the incident light with the phase bias indicated by the bias signal, modulate the light after the phase adjustment with the modulation signal, and output the modulated light that is the light after the modulation: a light intensity detector to detect light intensity of modulated light output from the quadrature optical modulator; a synchronous detection circuit to perform synchronous detection of a light intensity signal indicating light intensity detected by the light intensity detector and a dither signal, and output a synchronous detection signal indicating a result of the synchronous detection; and a bias signal generator to monitor a change in amplitude of the modulation signal, generate the bias signal in accordance with the synchronous detection signal output from the synchronous detection circuit when a range of the change is equal to or less than a first threshold, and generate a bias signal maintaining a phase bias before the range of the change becomes larger than the first threshold as the bias signal when the range of the change is larger than the first threshold.

Advantageous Effects of Invention

According to the present disclosure, an optical transmission device is configured to include a bias signal generating unit to monitor a change in amplitude of a modulation signal, generate a bias signal in accordance with a synchronous detection signal output from a synchronous detection circuit when a range of the change is equal to or less than a first threshold, and generate a bias signal maintaining a phase bias before the range of the change becomes larger than the first threshold as a bias signal to be output to a quadrature optical modulator when the range of the change is larger than the first threshold. Therefore, the optical transmission device according to the present disclosure can suppress deterioration of a modulated light after the phase adjustment by the quadrature optical modulator even if the result of the synchronous detection becomes temporally discontinuous.

BRIEF DESCRIPTION OF DRAWINGS

FIG. 2 is a hardware configuration diagram of a computer when a bias signal generating unit 8 is implemented by software, firmware, or the like.

DESCRIPTION OF EMBODIMENTS

In order to explain the present disclosure in more detail, embodiments for carrying out the present disclosure will be described below with reference to the accompanying drawings.

First Embodiment

Figure 1:
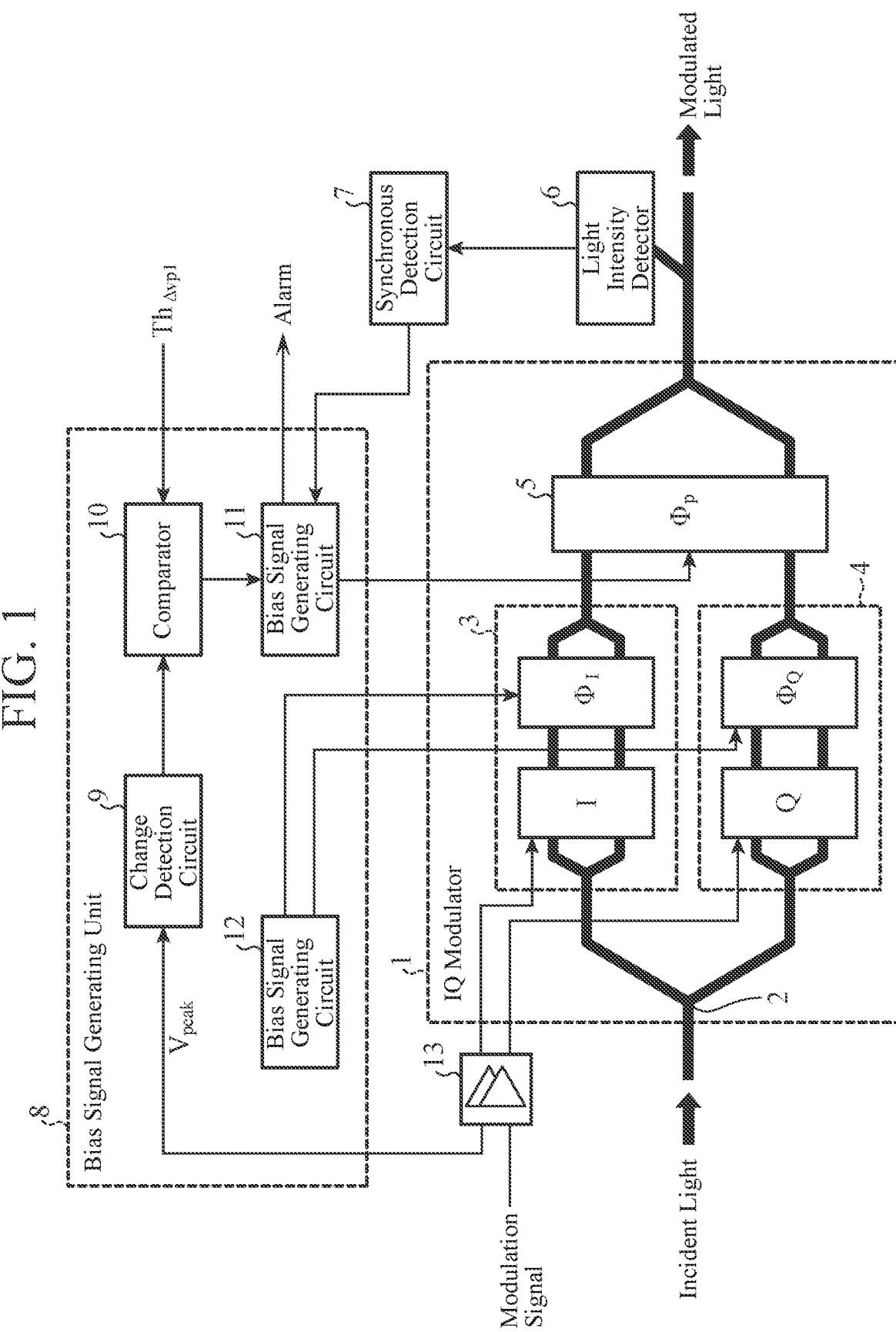
FIG. 1 is a configuration diagram illustrating an optical transmission device according to a first embodiment.

FIG. 1 is a configuration diagram illustrating an optical transmission device according to a first embodiment.

In FIG. 1, a quadrature optical modulator (hereinafter, referred to as an "IQ optical modulator") 1 includes a branch portion 2, a first Mach-Zehnder interferometer 3, a second Mach-Zehnder interferometer 4, and a phase adjustment electrode unit 5.

The IQ optical modulator 1 modulates incident light with a modulation signal, and adjusts a phase of modulated light that is light after the modulation with a phase bias indicated by a bias signal.

In the optical transmission device illustrated in FIG. 1, an IQ optical modulator 1 modulates incident light with a modulation signal, and then adjusts a phase of modulated light that is the light after the modulation with a phase bias indicated by the bias signal. However, this is merely an example, and the IQ optical modulator 1 may adjust a phase of the incident light with the phase bias indicated by the bias signal, and then modulate the light after the phase adjustment with the modulation signal.

As the light incident on the IQ optical modulator 1, continuous light emitted from a light source such as a laser diode (LD) or the like is used.

The branch portion 2 branches the incident light into two light beams, outputs one of the two branched light beams to the first Mach-Zehnder interferometer 3, and outputs the other of the two branched light beams to the second Mach-Zehnder interferometer 4.

The first Mach-Zehnder interferometer 3 is a Mach-Zehnder interferometer for Ich that is an in-phase channel, and modulates one of the two light beams branched by the branch portion 2 with a modulation signal for Ich output from a driver 13 to be described later.

In addition, the first Mach-Zehnder interferometer 3 adjusts a phase of the modulated light beam, which is the light beam after the modulation, with a phase bias pi indicated by a bias signal for Ich output from a bias signal generating circuit 12 to be described later, and outputs the modulated light beam after the phase adjustment to the phase adjustment electrode unit 5.

In the optical transmission device illustrated in FIG. 1, the first Mach-Zehnder interferometer 3 modulates one light beam with the modulation signal for Ich, and then adjusts the phase of the modulated light beam, which is the light beam after the modulation, with the phase bias 91. However, this is merely an example, and the first Mach-Zehnder interferometer 3 may adjust the phase of one light beam with the phase bias pi and then modulate the light beam after the phase adjustment with the modulation signal for Ich.

The second Mach-Zehnder interferometer 4 is a Mach-Zehnder interferometer for Qch, which is a channel orthogonal to the in-phase channel, and modulates the other of the two light beams branched by the branch portion 2 with a modulation signal for Qch output from the driver 13.

In addition, the second Mach-Zehnder interferometer 4 adjusts a phase of the modulated light beam, which is the light beam after the modulation, with a phase bias $\varphi Q$ indicated by a bias signal for Qch output from the bias signal generating circuit 12, and outputs the modulated light beam after the phase adjustment to the phase adjustment electrode unit 5.

In the optical transmission device illustrated in FIG. 1, the second Mach-Zehnder interferometer 4 modulates the other light beam with the modulation signal for Qch, and then adjusts a phase of the modulated light beam, which is the light beam after the modulation, with the phase bias $\varphi Q$. However, this is merely an example, and the second Mach-Zehnder interferometer 4 may adjust the phase of the other light beam with the phase bias $\varphi Q$, and then modulate the light beam after the phase adjustment with the modulation signal for Qch.

The phase adjustment electrode unit 5 adjusts the phase of the modulated light beam output from the first Mach-Zehnder interferometer 3 and the phase of the modulated light beam output from the second Mach-Zehnder interferometer 4 with a phase bias $\varphi Q$ indicated by a bias signal output from a bias signal generating circuit 11 described later.

The phase adjustment electrode unit 5 multiplexes the two modulated light beams after the phase adjustment with the phase bias $\varphi Q$, and outputs the multiplexed modulated light to the outside of the device.

The light intensity detector 6 is implemented by, for example, a photodetector.

The light intensity detector 6 detects the light intensity of the modulated light after the phase adjustment by the IQ optical modulator 1, that is, the multiplexed modulated light output from the phase adjustment electrode unit 5, and outputs a light intensity signal indicating the light intensity of the modulated light to a synchronous detection circuit 7 described later. The light intensity signal is an electric signal.

The synchronous detection circuit 7 is implemented by, for example, an automatic bias control circuit.

The synchronous detection circuit 7 performs synchronous detection of the light intensity signal indicating the light intensity detected by the light intensity detector 6 and a dither signal.

The synchronous detection circuit 7 outputs a synchronous detection signal indicating a result of the synchronous detection to a bias signal generating unit 8 described later.

The dither signal is a regular signal such as a sine wave or a triangular wave. A dither signal source that oscillates the dither signal may be provided outside the synchronous detection circuit 7 or may be built in the synchronous detection circuit 7.

The bias signal generating unit 8 includes a change detection circuit 9, a comparator 10, a bias signal generating circuit 11, and a bias signal generating circuit 12.

The bias signal generating unit 8 monitors a change in an amplitude $V_{peak}$ of the modulation signal output from the driver 13.

When a range of the change is equal to or less than a first threshold $Th_{\Delta V_{p1}}$, the bias signal generating unit 8 generates a bias signal in accordance with the synchronous detection signal output from the synchronous detection circuit 7.

When the range of the change is larger than the first threshold $Th_{\Delta V_{p1}}$, the bias signal generating unit 8 generates a bias signal maintaining the phase bias $\varphi P$ before the range of the change becomes larger than the first threshold $Th_{\Delta V_{p1}}$. The phase bias $\varphi P$ before the range of the change becomes larger than the first threshold $Th_{\Delta V_{p1}}$ is, for example, the phase bias φP immediately before the range of the change becomes larger than the first threshold $Th_{\Delta Vp1}$ among the one or more phase biases φP when the range of the change is equal to or less than the first threshold $Th_{\Delta Vp1}$. However, this is merely an example, and if there is no practical problem, the phase bias φP may be, for example, the phase bias φP before one sampling or before two sampling from the phase bias φP immediately before the range of the change becomes larger than the first threshold $Th_{\Delta Vp1}$.

When the range of the change is larger than the first threshold $Th_{\Delta Vp1}$, the bias signal generating unit 8 outputs an alarm to the outside of the device.

The bias signal generating unit 8 outputs the generated bias signal to the IQ optical modulator 1.

The first threshold $Th_{\Delta Vp1}$ may be stored in an internal memory of the bias signal generating unit 8 or may be given from the outside of the bias signal generating unit 8.

The change detection circuit 9 is implemented by, for example, a differentiating circuit.

The change detection circuit 9 monitors a change in the amplitude $V_{peak}$ of the modulation signal and outputs a signal indicating a change amount $\Delta V_{peak}$ which is a range of the change to the comparator 10.

The comparator 10 compares the change amount $\Delta V_{peak}$ indicated by the output signal of the change detection circuit 9 with the first threshold $Th_{\Delta Vp1}$, and outputs a comparison result between the change amount $\Delta V_{peal}$ and the first threshold $Th_{\Delta Vp1}$ to the bias signal generating circuit 11.

When the comparison result of the comparator 10 indicates that the change amount $\Delta V_{peak}$ is equal to or less than the first threshold $Th_{\Delta Vp1}$, the bias signal generating circuit 11 generates the bias signal in accordance with the synchronous detection signal output from the synchronous detection circuit 7.

When the comparison result of the comparator 10 indicates that the change amount $\Delta V_{peak}$ is larger than the first threshold $Th_{\Delta Vp1}$, the bias signal generating circuit 11 generates a bias signal maintaining the phase bias before the change amount $\Delta V_{peak}$ becomes larger than the first threshold $Th_{\Delta Vp1}$.

The bias signal generating circuit 11 outputs the generated bias signal to the phase adjustment electrode unit 5.

When the comparison result of the comparator 10 indicates that the change amount $\Delta V_{peak}$ is larger than the first threshold $Th_{\Delta Vp1}$, the bias signal generating circuit 11 outputs an alarm to the outside of the device.

The bias signal generating circuit 12 generates a bias signal for Ich indicating the phase bias φI, and outputs the bias signal for Ich to the first Mach-Zehnder interferometer 3.

Further, the bias signal generating circuit 12 generates a bias signal for Qch indicating the phase bias φQ and outputs the bias signal for Qch to the second Mach-Zehnder interferometer 4.

When a modulation signal is provided from the outside of the device, the driver 13 amplifies the modulation signal. The modulation signal provided from the outside of the device includes a modulation signal for Ich and a modulation signal for Qch.

The driver 13 outputs the amplified modulation signal for Ich to the first Mach-Zehnder interferometer 3, and outputs the amplified modulation signal for Qch to the second Mach-Zehnder interferometer 4.

In addition, the driver 13 monitors an amplitude $V_{peak,I}$ of the modulation signal for Ich or an amplitude $V_{peak,Q}$ of the modulation signal for Qch, and outputs the amplitude $V_{peak,I}$ or the amplitude $V_{peak,Q}$ to the change detection circuit 9 of the bias signal generating unit 8 as an amplitude $V_{peak}$.

In FIG. 1, it is assumed that each of the change detection circuit 9, the comparator 10, the bias signal generating circuit 11, and the bias signal generating circuit 12, which are components of the bias signal generating unit 8, is implemented by dedicated hardware.

In addition, each of the change detection circuit 9, the comparator 10, the bias signal generating circuit 11, and the bias signal generating circuit 12 corresponds, for example, to a single circuit, a composite circuit, a programmed processor, a parallel-programmed processor, an application specific integrated circuit (ASIC), a field-programmable gate array (FPGA), or a combination thereof.

The components of the bias signal generating unit 8 are not limited to those implemented by dedicated hardware, but the bias signal generating unit 8 may be implemented by software, firmware, or a combination of software and firmware.

The software or firmware is stored in a memory of a computer as a program. The computer means hardware that executes a program, and corresponds to, for example, a central processing unit (CPU), a central processing unit, a processing unit, an arithmetic unit, a microprocessor, a microcomputer, a processor, or a digital signal processor (DSP).

Figure 2:
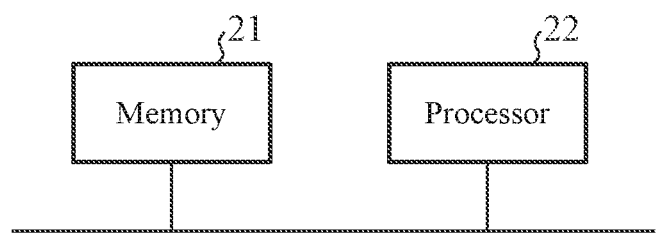

FIG. 2 is a hardware configuration diagram of a computer when the bias signal generating unit 8 is implemented by software, firmware, or the like.

In a case where the bias signal generating unit 8 is implemented by software, firmware, or the like, a program for causing a computer to execute processing procedures of the change detection circuit 9, the comparator 10, the bias signal generating circuit 11, and the bias signal generating circuit 12 is stored in the memory 21. Then, a processor 22 of the computer executes the program stored in the memory 21.

Figure 3:
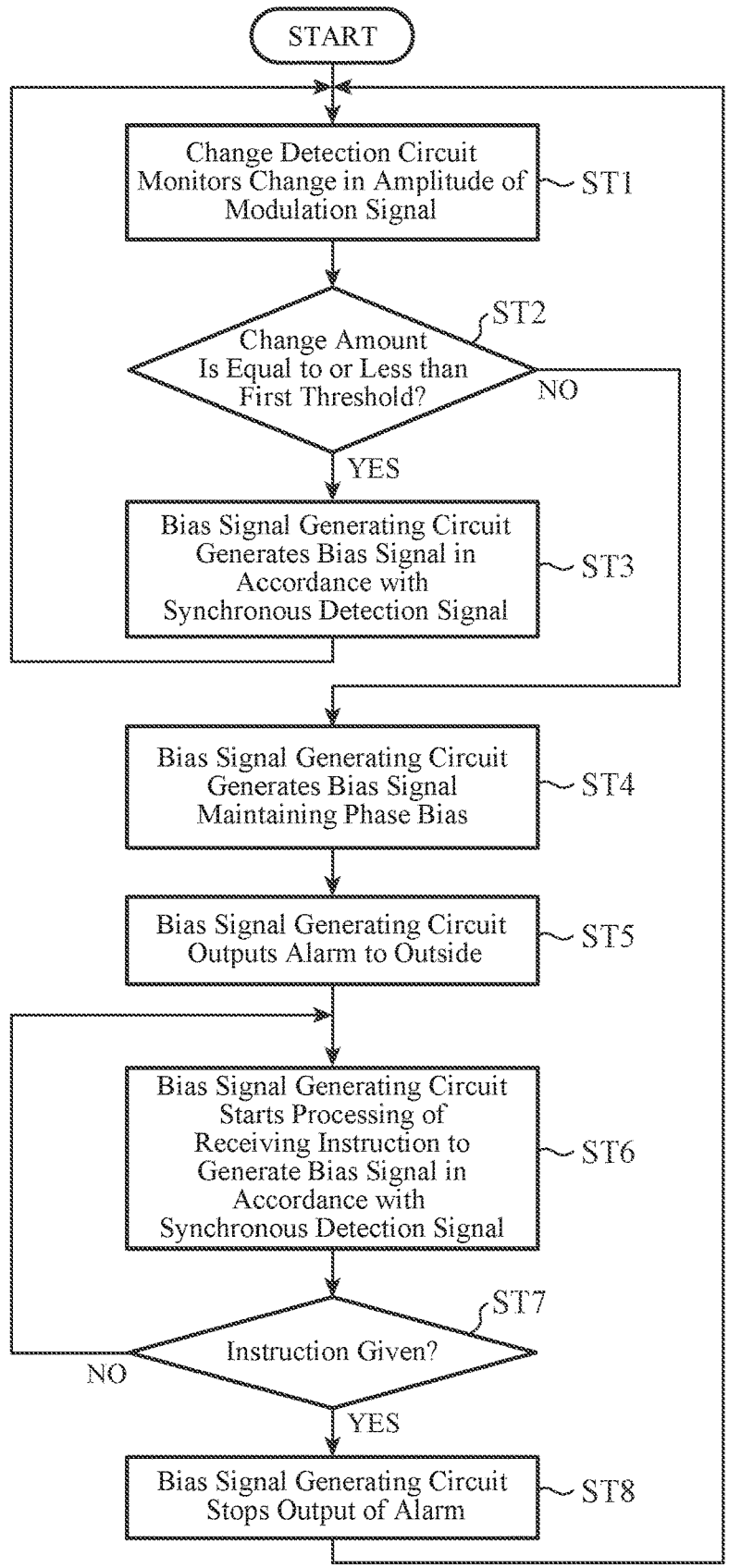
FIG. 3 is a flowchart illustrating a processing procedure of the bias signal generating unit 8.

Furthermore, FIG. 2 illustrates an example in which each of the components of the bias signal generating unit 8 is implemented by dedicated hardware, and FIG. 3 illustrates an example in which the bias signal generating unit 8 is implemented by software, firmware, or the like. However, this is merely an example, and some components in the bias signal generating unit 8 may be implemented by dedicated hardware, and the remaining components may be implemented by software, firmware, or the like.

Next, the operation of the optical transmission device shown in FIG. 1 will be described.

FIG. 3 is a flowchart illustrating a processing procedure of the bias signal generating unit 8.

Light emitted from a light source such as an LD (not illustrated) is incident on the branch portion 2 of the IQ optical modulator 1.

When a modulation signal is provided from the outside of the device, the driver 13 amplifies a modulation signal for Ich included in the modulation signal, and outputs the amplified modulation signal for Ich to the first Mach-Zehnder interferometer 3 of the IQ optical modulator 1.

The driver 13 amplifies the modulation signal for Qch included in the modulation signal, and outputs the amplified modulation signal for Qch to the second Mach-Zehnder interferometer 4 of the IQ optical modulator 1.

In addition, the driver 13 monitors the amplitude $V_{peak,I}$ of the modulation signal for Ich or the amplitude $V_{peak,Q}$ of the modulation signal for Qch.

The driver 13 outputs the amplitude $V_{peak,I}$ or the amplitude $V_{peak,Q}$ as the amplitude $V_{peak}$ to the change detection circuit 9 of the bias signal generating unit 8.

The bias signal generating circuit 12 generates a bias signal for Ich indicating the phase bias φI, and outputs the bias signal for Ich to the first Mach-Zehnder interferometer 3.

Further, the bias signal generating circuit 12 generates a bias signal for Qch indicating the phase bias φQ and outputs the bias signal for Qch to the second Mach-Zehnder interferometer 4.

The branch portion 2 branches the incident light into two light beams, and outputs one of the two branched light beams to the first Mach-Zehnder interferometer 3.

Further, the branch portion 2 outputs the other of the two branched light beams to the second Mach-Zehnder interferometer 4.

The first Mach-Zehnder interferometer 3 further branches one of the two light beams branched by the branch portion 2 into two light beams.

The first Mach-Zehnder interferometer 3 modulates each of the further branched light beams with the modulation signal for Ich output from the driver 13.

In addition, the first Mach-Zehnder interferometer 3 adjusts the phase of the modulated light beam that is each light beam after the modulation with the phase bias φI indicated by the bias signal for Ich output from the bias signal generating circuit 12.

The bias signal generating circuit 12 outputs a bias signal indicating a phase bias φI so that the phase difference between each modulated light beams after the phase adjustment by the first Mach-Zehnder interferometer 3 becomes π.

The first Mach-Zehnder interferometer 3 multiplexes each modulated light beams after the phase adjustment, and outputs the multiplexed modulated light to the phase adjustment electrode unit 5.

The second Mach-Zehnder interferometer 4 further branches the other of the two light beams branched by the branch portion 2 into two light beams.

The second Mach-Zehnder interferometer 4 modulates each of the further branched light beams with the modulation signal for Qch output from the driver 13.

In addition, the second Mach-Zehnder interferometer 4 adjusts the phase of the modulated light beam that is each light beam after the modulation with the phase bias φQ indicated by the bias signal for Qch output from the bias signal generating circuit 12.

The bias signal generating circuit 12 outputs a bias signal indicating a phase bias φQ so that the phase difference between each modulated light beams after the phase adjustment by the second Mach-Zehnder interferometer 4 becomes π.

The second Mach-Zehnder interferometer 4 multiplexes each modulated light beams after the phase adjustment, and outputs the multiplexed modulated light to the phase adjustment electrode unit 5.

The phase adjustment electrode unit 5 adjusts the phase of the modulated light beam after multiplexing by the first Mach-Zehnder interferometer 3 and the phase of the modulated light beam after multiplexing by the second Mach-Zehnder interferometer 4 with the phase bias φP indicated by the bias signal output from the bias signal generating circuit 11.

The bias signal generating circuit 11 outputs a bias signal indicating the phase bias φP so that the phase difference between each modulated light beams after the phase adjustment by the phase adjustment electrode unit 5 becomes π/2.

The phase adjustment electrode unit 5 multiplexes each modulated light beams after the phase adjustment, and outputs the multiplexed modulated light to the outside of the device.

Ideally, the phase difference between each modulated light beams after the phase adjustment becomes π/2. When the phase difference becomes π/2, synchronization is detected in the synchronous detection circuit 7, and the synchronous detection signal output from the synchronous detection circuit 7 becomes 0.

The light intensity detector 6 acquires a part of the multiplexed modulated light output from the phase adjustment electrode unit 5, and detects the light intensity of the multiplexed modulated light.

The light intensity detector 6 outputs a light intensity signal indicating the detected light intensity to the synchronous detection circuit 7.

The synchronous detection circuit 7 performs synchronous detection of the light intensity signal indicating the light intensity detected by the light intensity detector 6 and the dither signal.

Since the process of performing synchronous detection of the light intensity signal and the dither signal is a known technique, detailed description thereof is omitted, but for example, synchronous detection can be performed by the following method.

For example, the synchronous detection circuit 7 multiplies a signal corresponding to the amplitude of the light intensity signal or a signal corresponding to RMS that is a root mean square of the light intensity signal by the dither signal. Then, the synchronous detection circuit 7 filters the multiplication result to remove each of the high-frequency component and the direct-current component from the multiplication result, thereby obtaining a synchronous detection signal indicating the synchronous detection result. In the synchronous state, the synchronous detection signal becomes 0, and in the non-synchronous state, the synchronous detection signal becomes other than 0.

The synchronous detection circuit 7 outputs a synchronous detection signal indicating a result of the synchronous detection to the bias signal generating circuit 11 of the bias signal generating unit 8.

The change detection circuit 9 of the bias signal generating unit 8 monitors a change in the amplitude $V_{peak}$ of the modulation signal output from the driver 13 (step ST1 in FIG. 3).

The change detection circuit 9 outputs a signal indicating a change amount $\Delta V_{peak}$ which is a range of change of the amplitude $V_{peak}$ to the comparator 10.

The comparator 10 compares the change amount $\Delta V_{peak}$ indicated by the output signal of the change detection circuit 9 with the first threshold $Th_{\Delta V_{p1}}$.

When the modulation format of the modulation signal is changed from, for example, Quadrature Phase Shift Keying (QPSK) to 16 Quadrature Amplitude Modulation (QAM), it is assumed that the change amount $\Delta V_{peak}$ becomes about 300 mV. Therefore, in a case where it is assumed that the modulation format of the modulation signal is changed from QPSK to 16QAM, for example, a value of about 80% of about 300 mV is used as the first threshold $Th_{\Delta V_{p1}}$.

Furthermore, in a case where the modulation format of the modulation signal is changed from QPSK to 8QAM, for example, it is assumed that the change amount $\Delta V_{peak}$ becomes about 200 mV. Therefore, in a case where it is assumed that the modulation format of the modulation signal is changed from QPSK to 8QAM, for example, a value of about 80% of about 200 mV is used as the first threshold $Th_{\Delta V_{p1}}$.

The comparator 10 outputs a comparison result between the change amount $\Delta V_{peak}$ and the first threshold $Th_{\Delta V_{p1}}$ to the bias signal generating circuit 11.

If the comparison result of the comparator 10 indicates that the change amount $\Delta V_{peak}$ is equal to or less than the first threshold $Th_{\Delta V_{p1}}$ (in the case of YES in step ST2 in FIG. 3), the bias signal generating circuit 11 generates a bias signal indicating the phase bias φP in accordance with the synchronous detection signal output from the synchronous detection circuit 7 (step ST3 in FIG. 3).

The bias signal generating circuit 11 outputs the generated bias signal to the phase adjustment electrode unit 5.

As long as the bias signal with which the synchronous detection signal becomes 0 can be generated on the basis of the synchronous detection signal, any method may be used as a method of generating the bias signal. For example, a method can be used in which the bias signal generating circuit 11 generates the bias signal by adding the synchronous detection signal and the dither signal.

The phase adjustment electrode unit 5 adjusts the phase of the modulated light beam after multiplexing by the first Mach-Zehnder interferometer 3 and the phase of the modulated light beam after multiplexing by the second Mach-Zehnder interferometer 4 with the phase bias φP indicated by the bias signal output from the bias signal generating circuit 11.

If the phase bias φP indicated by the bias signal output from the bias signal generating circuit 11 is an appropriate phase bias, the phase difference between each modulated light beams after the phase adjustment by the phase adjustment electrode unit 5 becomes π/2.

If the comparison result of the comparator 10 indicates that the change amount $\Delta V_{peak}$ is larger than the first threshold $Th_{\Delta V_{p1}}$ (in the case of NO in step ST2 in FIG. 3), the bias signal generating circuit 11 generates a bias signal maintaining the phase bias φP before the change amount $\Delta V_{peak}$ becomes larger than the first threshold $Th_{\Delta V_{p1}}$ (step ST4 in FIG. 3).

The bias signal generating circuit 11 outputs the generated bias signal to the phase adjustment electrode unit 5.

In a case where the change amount $\Delta V_{peak}$ is larger than the first threshold $Th_{\Delta V_{p1}}$, there is a possibility that a situation such as a change in the modulation format of the modulation signal has occurred. Therefore, the result of the synchronous detection by the synchronous detection circuit 7 becomes temporally discontinuous, and as a result, there is a possibility that the phase bias φP indicated by the bias signal generated by the bias signal generating circuit 11, in accordance with the synchronous detection signal is adjusted to a wrong direction and the output signal of the IQ optical modulator 1 is deteriorated.

However, when the change amount $\Delta V_{peak}$ is larger than the first threshold $Th_{\Delta V_{p1}}$, the phase bias φP indicated by the bias signal generated by the bias signal generating circuit 11 is the same as the phase bias before the change amount $\Delta V_{peak}$ becomes larger than the first threshold $Th_{\Delta V_{p1}}$. Therefore, it is possible to suppress deterioration of the output signal of the IQ optical modulator 1 due to adjustment of the phase bias φP indicated by the bias signal generated by the bias signal generating circuit 11 to a wrong direction.

When the comparison result of the comparator 10 indicates that the change amount $\Delta V_{peak}$ is larger than the first threshold $Th_{\Delta V_{p1}}$, the bias signal generating circuit 11 outputs an alarm to the outside of the device (step ST5 in FIG. 3).

As a result, the user of the optical transmission device illustrated in FIG. 1 or the external device of the optical transmission device illustrated in FIG. 1 can recognize that the automatic bias control for generating the bias signal in accordance with the synchronous detection signal output from the synchronous detection circuit 7 is stopped.

After generating the bias signal maintaining the phase bias φP, the bias signal generating circuit 11 starts processing of receiving an instruction to generate the bias signal in accordance with the synchronous detection signal from the outside of the device (step ST6 in FIG. 3).

When an instruction to generate the bias signal in accordance with the synchronous detection signal is given from the outside of the device (in the case of YES in step ST7 in FIG. 3), the bias signal generating circuit 11 stops the output of the alarm (step ST8 in FIG. 3) and restarts processing of generating the bias signal in accordance with the synchronous detection signal.

When the instruction to generate the bias signal in accordance with the synchronous detection signal is not given from the outside of the device (in the case of NO in step ST7 in FIG. 3), the bias signal generating circuit 11 continues the processing of receiving instruction without restarting the processing of generating the bias signal in accordance with the synchronous detection signal (step ST6 in FIG. 3).

In the first embodiment described above, the optical transmission device is configured to include: an IQ optical modulator 1 to modulate incident light with a modulation signal, then adjust a phase of the modulated light that is the light after the modulation with a phase bias indicated with a bias signal, and output the modulated light after the phase adjustment, or adjust a phase of incident light with a phase bias indicated by the bias signal, modulate the light after the phase adjustment with the modulation signal, and output the modulated light that is the light after the modulation; a light intensity detector 6 to detect light intensity of the modulated light output from the IQ optical modulator 1; a synchronous detection circuit 7 to perform synchronous detection of a light intensity signal indicating light intensity detected by the light intensity detector 6 and a dither signal, and output a synchronous detection signal indicating a result of the synchronous detection; and a bias signal generating unit 8 to monitor a change in amplitude of the modulation signal, generate a bias signal in accordance with the synchronous detection signal output from the synchronous detection circuit 7 when a range of the change is equal to or less than a first threshold, and generate a bias signal maintaining a phase bias before the range of the change becomes larger than the first threshold as the bias signal output to the IQ optical modulator 1 when the range of the change is larger than the first threshold. Therefore, the optical transmission device can suppress the deterioration of the modulated light after the phase adjustment by the IQ optical modulator 1 even if the result of the synchronous detection becomes temporally discontinuous.

Second Embodiment

In a second embodiment, an optical transmission device will be described in which a bias signal generating unit 14 monitors a change in the amplitude $V_{peak}$ and restarts processing of generating the bias signal in accordance with the synchronous detection signal when the range of the change is smaller than a second threshold $Th_{\Delta V_{p2}}$.

Figure 4:
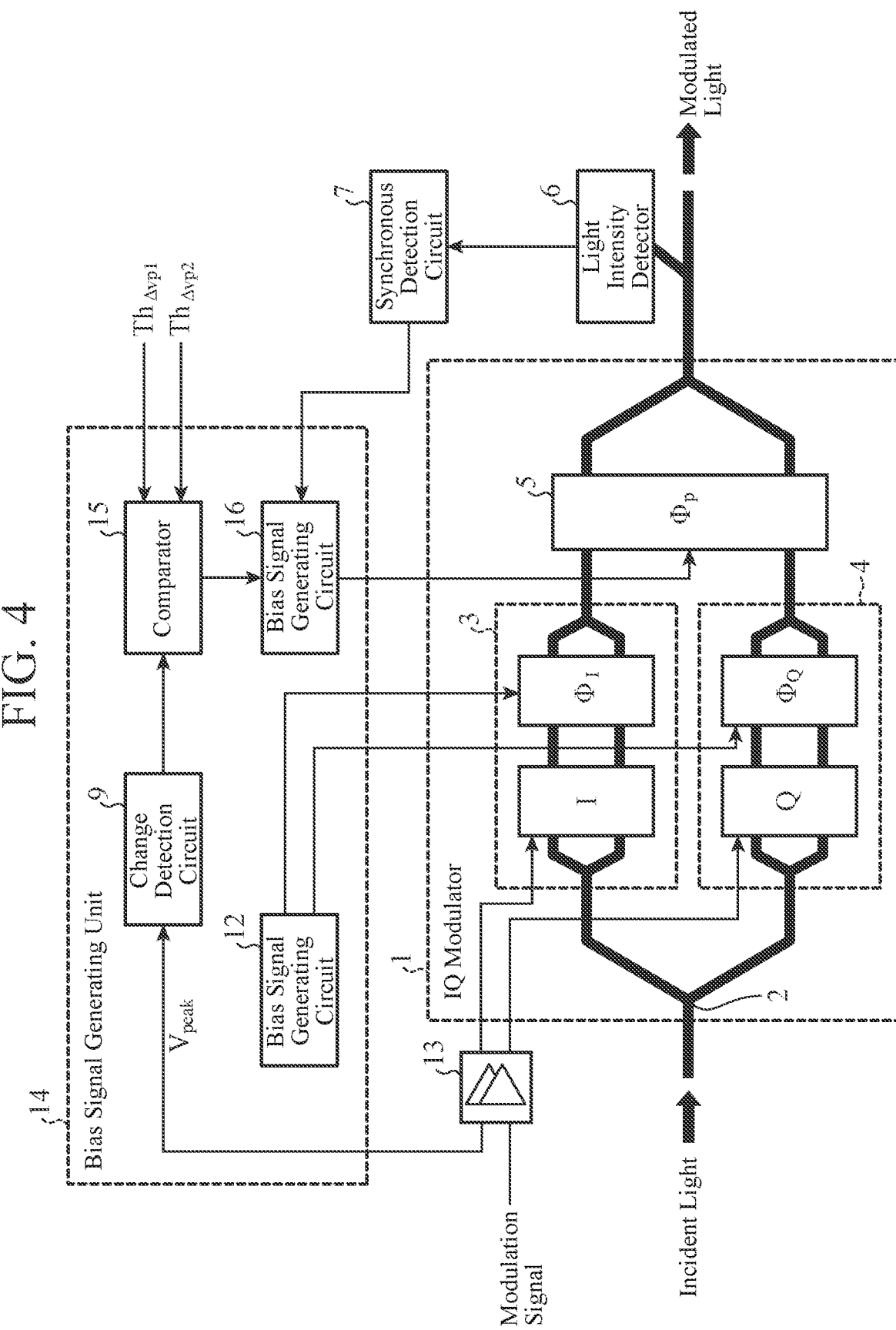
FIG. 4 is a configuration diagram illustrating an optical transmission device according to a second embodiment.

FIG. 4 is a configuration diagram illustrating the optical transmission device according to the second embodiment. In FIG. 4, the same reference numerals as those in FIG. 1 denote the same or corresponding parts, and thus description thereof is omitted.

The bias signal generating unit 14 includes a change detection circuit 9, a comparator 15, a bias signal generating circuit 12, and a bias signal generating circuit 16.

When the range of the change is larger than the first threshold $Th_{\Delta V_{p1}}$, the bias signal generating unit 14 generates a bias signal maintaining the phase bias φP before the range of the change in the amplitude $V_{peak}$ of the modulation signal becomes larger than the first threshold $Th_{\Delta V_{p1}}$, similarly to the bias signal generating unit 8 illustrated in FIG. 1.

Upon generating the bias signal maintaining the phase bias φP before the range of the change in the amplitude $V_{peak}$ of the modulation signal becomes larger than the first threshold $Th_{\Delta V_{p1}}$, the bias signal generating unit 14 monitors the change in the amplitude $V_{peak}$ of the modulation signal.

When the range of the change is smaller than the second threshold $Th_{\Delta V_{p2}}$, the bias signal generating unit 14 restarts the processing of generating the bias signal indicating the phase bias φP in accordance with the synchronous detection signal.

Each of the first threshold $Th_{\Delta V_{p1}}$ and the second threshold $Th_{\Delta V_{p2}}$ may be stored in an internal memory of the bias signal generating unit 14 or may be given from the outside of the bias signal generating unit 14.

In addition, the magnitude relationship between the first threshold $Th_{\Delta V_{p1}}$ and the second threshold $Th_{\Delta V_{p2}}$ is determined by, for example, the degree of control stability requirement. When it is necessary to enhance the control stability, the first threshold $Th_{\Delta V_{p1}}$ is desirably a value larger than the second threshold $Th_{\Delta V_{p2}}$.

Unlike the bias signal generating unit 8 illustrated in FIG. 1, the bias signal generating unit 14 does not output the alarm to the outside of the device, but may output the alarm to the outside of the device similarly to the bias signal generating unit 8 illustrated in FIG. 1.

The comparator 15 compares the change amount $\Delta V_{peak}$ indicated by the output signal of the change detection circuit 9 with the first threshold $Th_{\Delta V_{p1}}$ and outputs a comparison result between the change amount $\Delta V_{peak}$ and the first threshold $Th_{\Delta V_{p1}}$ to the bias signal generating circuit 16 as a first comparison result.

Further, the comparator 15 compares the change amount $\Delta V_{peak}$ indicated by the output signal of the change detection circuit 9 with the second threshold $Th_{\Delta V_{p2}}$, and outputs a comparison result between the change amount $\Delta V_{peak}$ and the second threshold $Th_{\Delta V_{p2}}$ to the bias signal generating circuit 16 as a second comparison result.

When the first comparison result of the comparator 15 indicates that the change amount $\Delta V_{peak}$ is equal to or less than the first threshold $Th_{\Delta V_{p1}}$, the bias signal generating circuit 16 generates a bias signal indicating the phase bias φP in accordance with the synchronous detection signal output from the synchronous detection circuit 7.

When the first comparison result of the comparator 15 indicates that the change amount $\Delta V_{peak}$ is larger than the first threshold $Th_{\Delta V_{p1}}$, the bias signal generating circuit 16 generates a bias signal maintaining the phase bias φP before the change amount $\Delta V_{peak}$ becomes larger than the first threshold $Th_{\Delta V_{p1}}$.

The bias signal generating circuit 16 outputs the generated bias signal to the phase adjustment electrode unit 5.

After generating the bias signal maintaining the phase bias φP, if the second comparison result of the comparator 15 indicates that the change amount $\Delta V_{peak}$ of the amplitude $V_{peak}$ is smaller than the second threshold $Th_{\Delta V_{p2}}$, the bias signal generating circuit 16 restarts the processing of generating the bias signal indicating the phase bias φP in accordance with the synchronous detection signal output from the synchronous detection circuit 7.

Next, the operation of the optical transmission device shown in FIG. 4 will be described.

Operations other than the bias signal generating unit 14 are similar to those of the optical transmission device illustrated in FIG. 1 and the operations different from those of the optical transmission device illustrated in FIG. 1 will be described.

Figure 5:
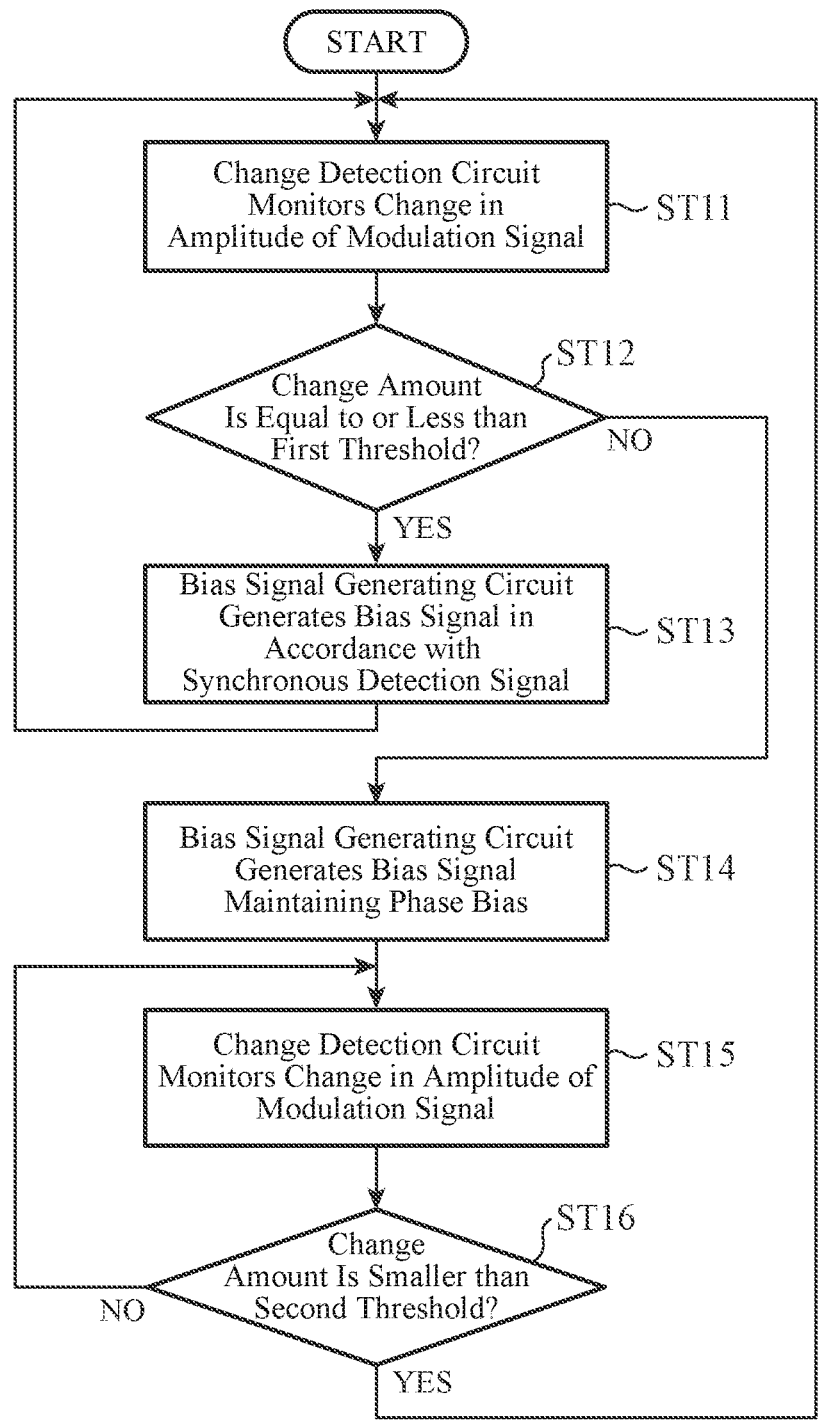
FIG. 5 is a flowchart illustrating a processing procedure of a bias signal generating unit 14.

FIG. 5 is a flowchart illustrating a processing procedure of the bias signal generating unit 14.

The change detection circuit 9 of the bias signal generating unit 14 monitors a change in the amplitude $V_{peak}$ of the modulation signal output from the driver 13 (step ST11 in FIG. 5).

The change detection circuit 9 outputs a signal indicating a change amount $\Delta V_{peak}$ which is a range of change of the amplitude $V_{peak}$ to the comparator 15.

The comparator 15 compares the change amount $\Delta V_{peak}$ indicated by the output signal of the change detection circuit 9 with the first threshold $Th_{\Delta V_{p1}}$.

The comparator 15 outputs a comparison result between the change amount $\Delta V_{peak}$ and the first threshold $Th_{\Delta V_{p1}}$ to the bias signal generating circuit 16 as a first comparison result.

If the first comparison result of the comparator 15 indicates that the change amount $\Delta V_{peak}$ is equal to or less than the first threshold $Th_{\Delta V_{p1}}$ (in the case of YES in step ST12 in FIG. 5), the bias signal generating circuit 16 generates a bias signal indicating the phase bias φP in accordance with the synchronous detection signal output from the synchronous detection circuit 7 similarly to the bias signal generating circuit 11 illustrated in FIG. 1 (step ST13 in FIG. 5).

The bias signal generating circuit 16 outputs the generated bias signal to the phase adjustment electrode unit 5.

If the first comparison result of the comparator 15 indicates that the change amount $\Delta V_{peak}$ is larger than the first threshold $Th_{\Delta V_{p1}}$ (in the case of NO in step ST12 in FIG. 5), the bias signal generating circuit 16 generates a bias signal maintaining the phase bias φP before the change amount $\Delta V_{peak}$ becomes larger than the first threshold $Th_{\Delta V_{p1}}$, similarly to the bias signal generating circuit 11 illustrated in FIG. 1 (step ST14 in FIG. 5).

The bias signal generating circuit 16 outputs the generated bias signal to the phase adjustment electrode unit 5.

The change detection circuit 9 monitors a change in the amplitude $V_{peak}$ of the modulation signal output from the driver 13 also after the bias signal generating circuit 16 generates the bias signal maintaining the phase bias φP (step ST15 in FIG. 5).

The change detection circuit 9 outputs a signal indicating the change amount $\Delta V_{peak}$ of the amplitude $V_{peak}$ to the comparator 15.

The comparator 15 compares the change amount $\Delta V_{peak}$ indicated by the output signal of the change detection circuit 9 with the second threshold $Th_{\Delta V_{p2}}$.

The comparator 15 outputs a comparison result between the change amount $\Delta V_{peak}$ and the second threshold $Th_{\Delta V_{p2}}$ to the bias signal generating circuit 16 as a second comparison result.

When the second comparison result of the comparator 15 indicates that the change amount $\Delta V_{peak}$ of the amplitude $V_{peak}$ is smaller than the second threshold $Th_{\Delta Vp2}$ (in the case of YES in step ST16 in FIG. 5), the bias signal generating circuit 16 restarts the processing of generating the bias signal indicating the phase bias φP in accordance with the synchronous detection signal output from the synchronous detection circuit 7.

If the second comparison result of the comparator 15 indicates that the change amount $\Delta V_{peak}$ of the amplitude $V_{peak}$ is equal to or more than the second threshold $Th_{\Delta Vp2}$ (in the case of NO in step ST16 in FIG. 5), the bias signal generating circuit 16 does not restart the processing of generating the bias signal indicating the phase bias φP in accordance with the synchronous detection signal. The change detection circuit 9 continuously monitors a change in the amplitude $V_{peak}$ of the modulation signal output from the driver 13 (step ST15 in FIG. 5).

In the second embodiment described above, the optical transmission device illustrated in FIG. 4 is configured so that the bias signal generating unit 14 generates the bias signal maintaining the phase bias before the range of change in the amplitude of the modulation signal becomes larger than the first threshold, then monitors the change in the amplitude of the modulation signal, and restarts the processing of generating the bias signal in accordance with the synchronous detection signal when the range of change is smaller than the second threshold. Therefore, similarly to the optical transmission device illustrated in FIG. 1, the optical transmission device illustrated in FIG. 4 can suppress the deterioration of the modulated light after the phase adjustment by the IQ optical modulator 1 even if the result of the synchronous detection becomes temporally discontinuous. In addition, it is possible to automatically restart the processing of generating the bias signal in accordance with the synchronous detection signal.

Third Embodiment

In a third embodiment, an optical transmission device including a bias signal generating unit 30 to compare an amplitude $V_{peak}$ of a modulation signal with each of an amplitude lower limit value $L_{lim1}$ and an amplitude upper limit value $U_{lim1}$ will be described.

Figure 6:
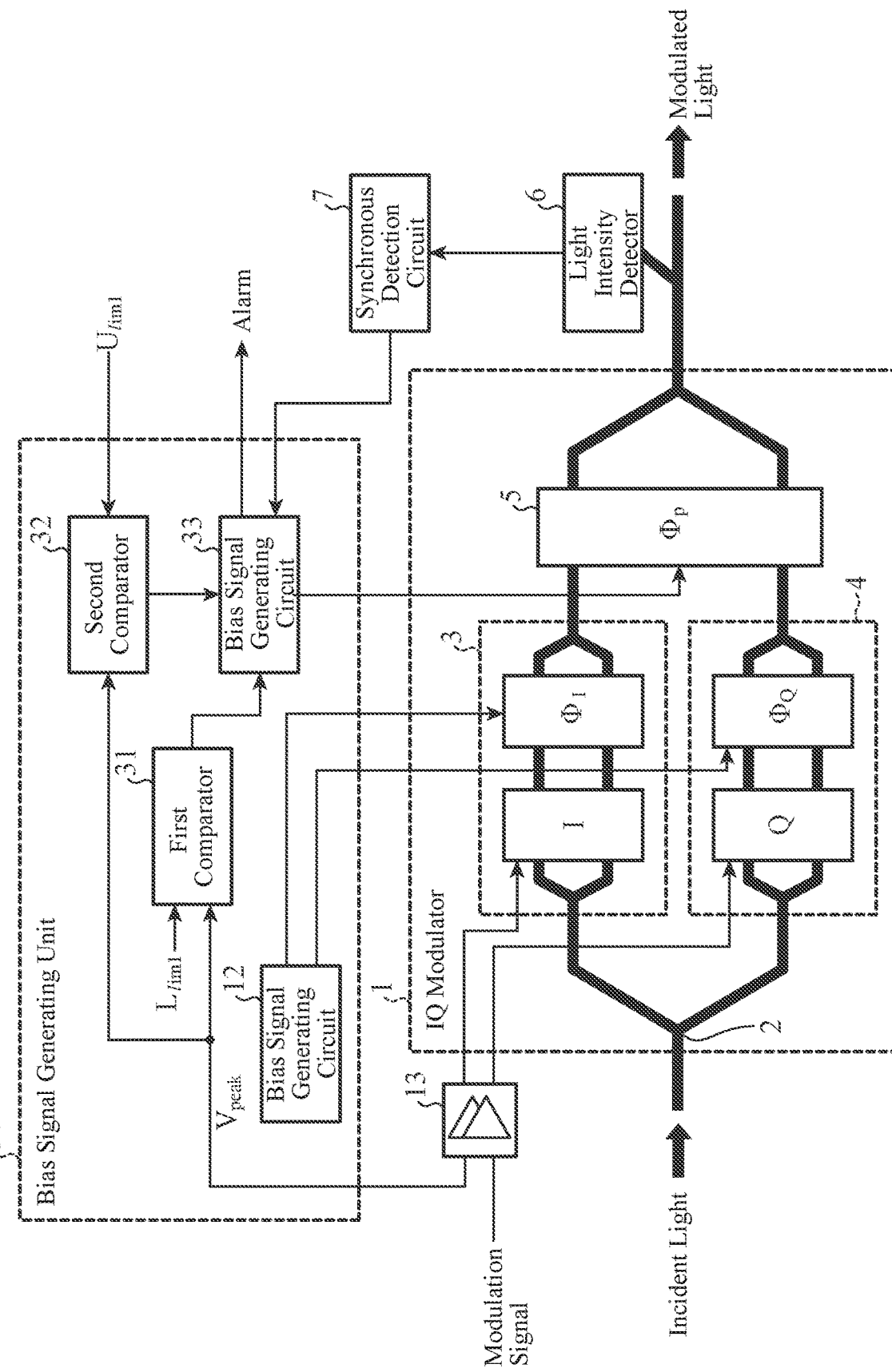
FIG. 6 is a configuration diagram illustrating an optical transmission device according to a third embodiment.

FIG. 6 is a configuration diagram illustrating an optical transmission device according to the third embodiment. In FIG. 6, the same reference numerals as those in FIGS. 1 and 4 denote the same or corresponding parts, and thus description thereof is omitted.

The bias signal generating unit 30 includes a first comparator 31, a second comparator 32, a bias signal generating circuit 12, and a bias signal generating circuit 33.

The bias signal generating unit 30 monitors a change in the amplitude $V_{peak}$ of the modulation signal, and generates a bias signal indicating the phase bias φP in accordance with the synchronous detection signal output from the synchronous detection circuit 7 when the range of the change is equal to or less than the first threshold $Th_{\alpha Vp1}$.

When the range of the change is larger than the first threshold $Th_{\Delta Vp1}$, the bias signal generating unit 30 generates a bias signal maintaining the phase bias φP before the range of the change becomes larger than the first threshold $Th_{\Delta Vp1}$.

The first comparator 31 compares the amplitude $V_{peak}$ of the modulation signal with the amplitude lower limit value $L_{lim1}$, and outputs a comparison result between the amplitude $V_{peak}$ and the amplitude lower limit value $L_{lim1}$ to the bias signal generating circuit 33.

The second comparator 32 compares the amplitude $V_{peak}$ of the modulation signal with an amplitude upper limit value $U_{lim1}$ larger than the amplitude lower limit value $L_{lim1}$ by a first threshold $Th_{\Delta Vp1}$, and outputs a comparison result between the amplitude $V_{peak}$ and the amplitude upper limit value $U_{lim1}$ to the bias signal generating circuit 33. $L_{lim1}+Th_{\Delta Vp1}=U_{lim1}$.

Each of the amplitude lower limit value $L_{lim1}$ and the amplitude upper limit value $U_{lim1}$ may be stored in an internal memory of the bias signal generating unit 30 or may be provided from the outside of the bias signal generating unit 30.

When the comparison result of the first comparator 31 indicates that the amplitude $V_{peak}$ of the modulation signal is equal to or more than the amplitude lower limit value $L_{lim1}$, and the comparison result of the second comparator 32 indicates that the amplitude $V_{peak}$ of the modulation signal is equal to or less than the amplitude upper limit value $U_{lim1}$, the bias signal generating circuit 33 generates a bias signal indicating the phase bias φP in accordance with the synchronous detection signal output from the synchronous detection circuit 7.

When the comparison result of the first comparator 31 indicates that the amplitude $V_{peak}$ of the modulation signal is smaller than the amplitude lower limit value $L_{lim1}$, the bias signal generating circuit 33 generates a bias signal maintaining the phase bias φP before the amplitude $V_{peak}$ of the modulation signal becomes smaller than the amplitude lower limit value $L_{lim1}$.

When the comparison result of the second comparator 32 indicates that the amplitude $V_{peak}$ of the modulation signal is larger than the amplitude upper limit value $U_{lim1}$, the bias signal generating circuit 33 generates a bias signal maintaining the phase bias φP before the amplitude $V_{peak}$ of the modulation signal becomes larger than the amplitude upper limit value $U_{lim1}$.

Next, the operation of the optical transmission device shown in FIG. 6 will be described.

Operations other than the bias signal generating unit 30 are similar to those of the optical transmission device illustrated in FIG. 1 and the operations different from those of the optical transmission device illustrated in FIG. 1 will be described.

Figure 7:
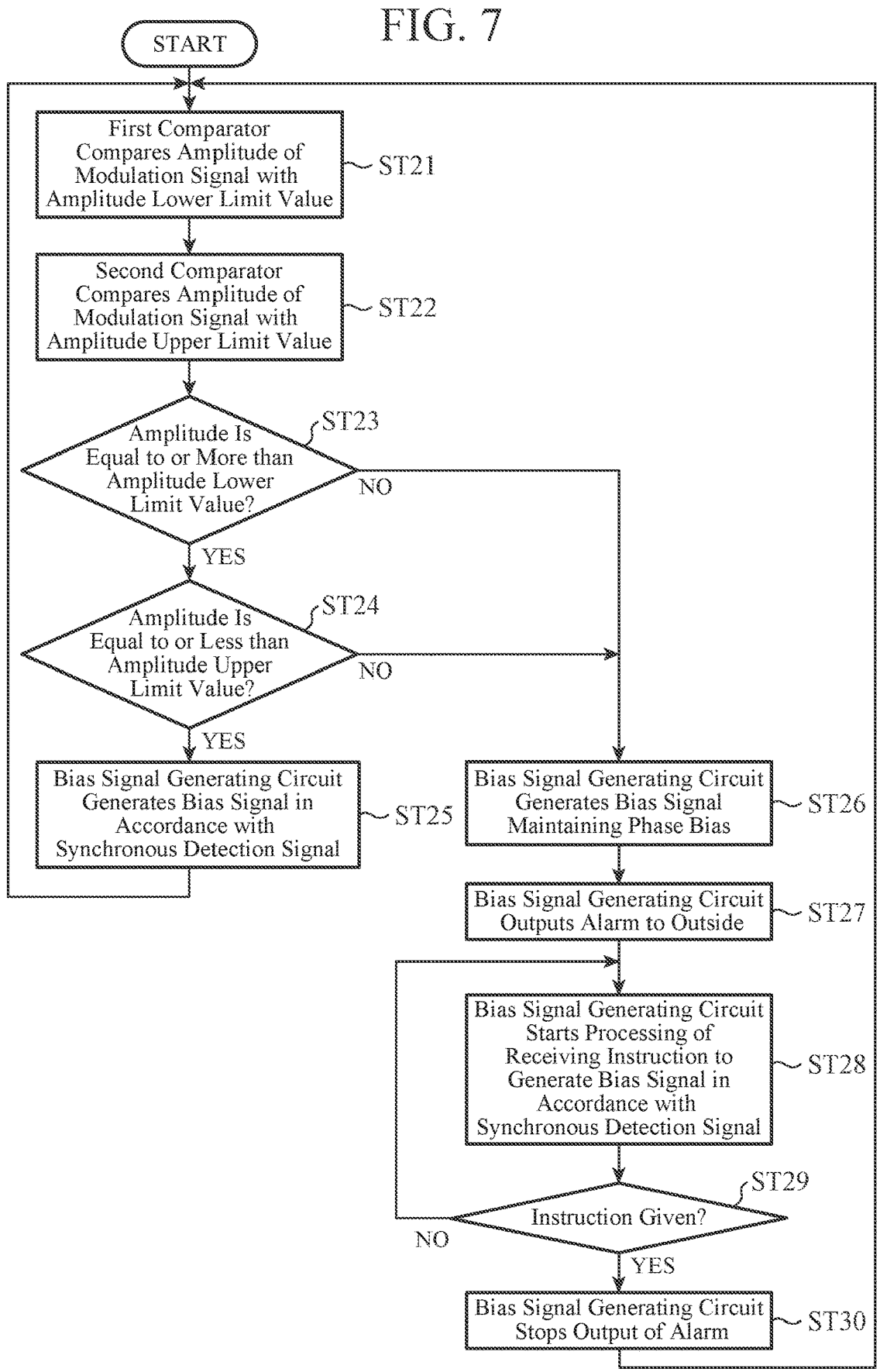
FIG. 7 is a flowchart illustrating a processing procedure of a bias signal generating unit 30.

FIG. 7 is a flowchart illustrating a processing procedure of the bias signal generating unit 30.

The first comparator 31 of the bias signal generating unit 30 compares the amplitude $V_{peak}$ of the modulation signal output from the driver 13 with the amplitude lower limit value $L_{lim1}$ (step ST21 in FIG. 7).

The first comparator 31 outputs a comparison result between the amplitude $V_{peak}$ and the amplitude lower limit value $L_{lim1}$ to the bias signal generating circuit 33.

The second comparator 32 compares the amplitude $V_{peak}$ of the modulation signal output from the driver 13 with the amplitude upper limit value $U_{lim1}$ (step ST22 in FIG. 7).

The second comparator 32 outputs a comparison result between the amplitude $V_{peak}$ and the amplitude upper limit value $U_{lim1}$ to the bias signal generating circuit 33.

If the comparison result of the first comparator 31 indicates that the amplitude $V_{peak}$ of the modulation signal is equal to or more than the amplitude lower limit value $L_{lim1}$ (in the case of YES in step ST23 in FIG. 7), and the comparison result of the second comparator 32 indicates that the amplitude $V_{peak}$ of the modulation signal is equal to or less than the amplitude upper limit value $U_{lim1}$ (in the case of YES in step ST24 in FIG. 7), the bias signal generating circuit 33 generates a bias signal indicating the phase bias φP in accordance with the synchronous detection signal output from the synchronous detection circuit 7 (step ST25 in FIG. 7).

That is, if $L_{lim1} \leq V_{peak} \leq U_{lim1}$ holds, the bias signal generating circuit 33 generates a bias signal indicating the phase bias φP in accordance with the synchronous detection signal output from the synchronous detection circuit 7.

The bias signal generating circuit 33 outputs the generated bias signal to the phase adjustment electrode unit 5.

If the comparison result of the first comparator 31 indicates that the amplitude $V_{peak}$ of the modulation signal is smaller than the amplitude lower limit value $L_{lim1}$ (in the case of NO in step ST23 in FIG. 7), the bias signal generating circuit 33 generates a bias signal maintaining the phase bias φP before the amplitude $V_{peak}$ of the modulation signal becomes smaller than the amplitude lower limit value $L_{lim1}$ (step ST26 in FIG. 7).

That is, if $V_{peak} < L_{lim1}$ holds, the bias signal generating circuit 33 generates a bias signal maintaining the phase bias φP before the amplitude $V_{peak}$ of the modulation signal becomes smaller than the amplitude lower limit value $L_{lim1}$.

The bias signal generating circuit 33 outputs the generated bias signal to the phase adjustment electrode unit 5.

In addition, the bias signal generating circuit 33 outputs an alarm to the outside of the device (step ST27 in FIG. 7).

If the comparison result of the second comparator 32 indicates that the amplitude $V_{peak}$ of the modulation signal is larger than the amplitude upper limit value $U_{lim1}$ (in the case of NO in step ST24 in FIG. 7), the bias signal generating circuit 33 generates a bias signal maintaining the phase bias φP before the amplitude $V_{peak}$ of the modulation signal becomes larger than the amplitude upper limit value $U_{lim1}$ (step ST26 in FIG. 7).

That is, if $V_{peak} > U_{lim1}$ holds, the bias signal generating circuit 33 generates a bias signal maintaining the phase bias φP before the amplitude $V_{peak}$ of the modulation signal becomes larger than the amplitude upper limit value $U_{lim1}$.

The bias signal generating circuit 33 outputs the generated bias signal to the phase adjustment electrode unit 5.

In addition, the bias signal generating circuit 33 outputs an alarm to the outside of the device (step ST27 in FIG. 7).

After generating the bias signal maintaining the phase bias φP, the bias signal generating circuit 33 starts processing of receiving an instruction to generate the bias signal in accordance with the synchronous detection signal from the outside of the device (step ST28 in FIG. 7).

When an instruction to generate the bias signal in accordance with the synchronous detection signal is given from the outside of the device (in the case of YES in step ST29 in FIG. 7), the bias signal generating circuit 33 stops the output of the alarm (step ST30 in FIG. 7) and restarts the processing of generating the bias signal in accordance with the synchronous detection signal.

When the instruction to generate the bias signal in accordance with the synchronous detection signal is not given from the outside of the device (in the case of NO in step ST29 in FIG. 7), the bias signal generating circuit 33 continues the processing of receiving instruction without restarting the processing of generating the bias signal in accordance with the synchronous detection signal (step ST28 in FIG. 7).

As described above, also in the optical transmission device illustrated in FIG. 6, similarly to the optical transmission device illustrated in FIG. 1, even if the result of the synchronous detection becomes temporally discontinuous, it is possible to suppress deterioration of the modulated light after the phase adjustment by the IQ optical modulator 1.

Fourth Embodiment

In a fourth embodiment, the bias signal generating unit 34 generates a bias signal maintaining the phase bias φP before the amplitude $V_{peak}$ of the modulation signal becomes smaller than the amplitude lower limit value $L_{lim1}$, or generates a bias signal maintaining the phase bias φP before the amplitude $V_{peak}$ becomes larger than the amplitude upper limit value $U_{lim1}$. An optical transmission device will be described in which the bias signal generating unit 34 thereafter monitors a change in the amplitude $V_{peak}$ and restarts the processing of generating the bias signal in accordance with the synchronous detection signal when the range of the change is smaller than the second threshold $Th_{\alpha Vp2}$.

Figure 8:
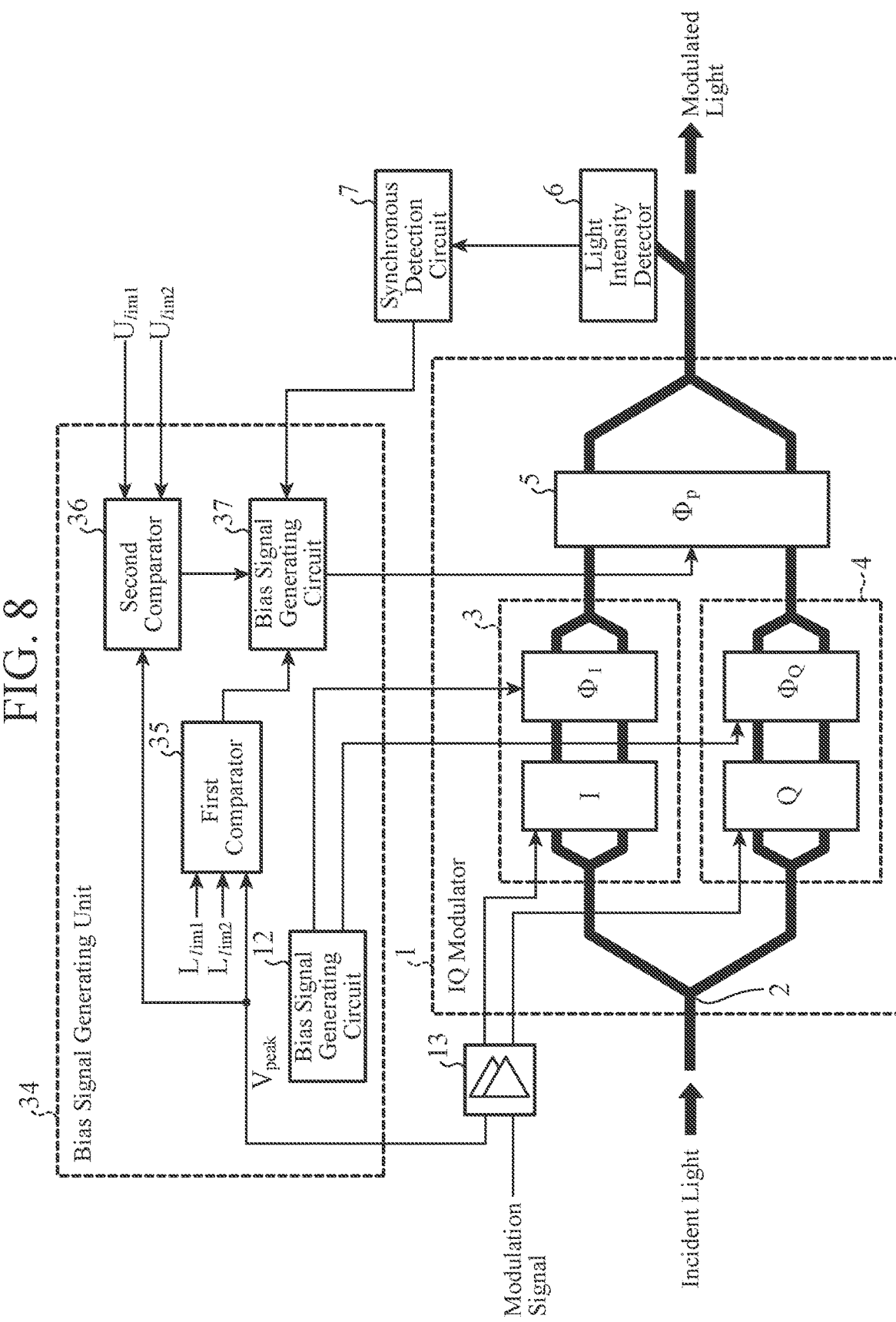
FIG. 8 is a configuration diagram illustrating an optical transmission device according to a fourth embodiment.

FIG. 8 is a configuration diagram illustrating an optical transmission device according to the fourth embodiment. In FIG. 8, the same reference numerals as those in FIGS. 1 and 6 denote the same or corresponding parts, and thus description thereof is omitted.

The bias signal generating unit 34 includes a first comparator 31, a second comparator 32, a bias signal generating circuit 12, and a bias signal generating circuit 37.

When the amplitude $V_{peak}$ of the modulation signal is smaller than the amplitude lower limit value $L_{lim1}$, the bias signal generating unit 34 generates a bias signal maintaining the phase bias φP before the amplitude $V_{peak}$ of the modulation signal becomes smaller than the amplitude lower limit value $L_{lim1}$, similarly to the bias signal generating unit 30 illustrated in FIG. 6.

When the amplitude $V_{peak}$ of the modulation signal is larger than the amplitude upper limit value $U_{lim1}$, the bias signal generating unit 34 generates a bias signal maintaining the phase bias φP before the amplitude $V_{peak}$ of the modulation signal becomes larger than the amplitude upper limit value $U_{lim1}$, similarly to the bias signal generating unit 30 illustrated in FIG. 6.

Upon generating a bias signal maintaining the phase bias φP before the amplitude $V_{peak}$ becomes smaller than the amplitude lower limit value $L_{lim1}$ or generating a bias signal maintaining the phase bias φP before the amplitude $V_{peak}$ becomes larger than the amplitude upper limit value $U_{lim1}$, the bias signal generating unit 34 monitors a change in the amplitude $V_{peak}$ of the modulation signal.

When the range of the change is smaller than the second threshold $Th_{\Delta Vp2}$, the bias signal generating unit 34 restarts the processing of generating the bias signal indicating the phase bias φP in accordance with the synchronous detection signal.

Unlike the bias signal generating unit 30 illustrated in FIG. 6, the bias signal generating unit 34 does not output an alarm to the outside of the device. However, this is merely an example, and the bias signal generating unit 34 may output an alarm to the outside of the device similarly to the bias signal generating unit 30 illustrated in FIG. 6.

The first comparator 35 compares the amplitude $V_{peak}$ of the modulation signal with the amplitude lower limit value $L_{lim1}$, and outputs a first comparison result to the bias signal generating circuit 37 as a comparison result between the amplitude $V_{peak}$ and the amplitude lower limit value $L_{lim1}$.

In addition, the first comparator 35 compares the amplitude $V_{peak}$ of the modulation signal with the amplitude lower limit value $L_{lim2}$, and outputs a second comparison result to the bias signal generating circuit 37 as a comparison result between the amplitude $V_{peak}$ and the amplitude lower limit value $L_{lim2}$.

Each of the amplitude lower limit value $L_{lim1}$ and the amplitude lower limit value $L_{lim2}$ may be stored in an internal memory of the bias signal generating unit 34 or may be provided from the outside of the bias signal generating unit 34.

The magnitude relationship between the amplitude lower limit value $L_{lim1}$ and the amplitude lower limit value $L_{lim2}$ is determined by the degree of control stability requirement. When it is necessary to enhance the control stability, the amplitude lower limit value $L_{lim1}$ is desirably a value smaller than the amplitude lower limit value $L_{lim2}$.

The second comparator 36 compares the amplitude $V_{peak}$ a of the modulation signal with an amplitude upper limit value $U_{lim1}$ larger than the amplitude lower limit value $L_{lim1}$ by a first threshold $Th_{\Delta Vp1}$, and outputs a third comparison result to the bias signal generating circuit 37 as a comparison result between the amplitude $V_{peak}$ and the amplitude upper limit value $U_{lim1}$. $L_{lim1}+Th_{\Delta Vp1}=U_{lim1}$.

In addition, the second comparator 36 compares the amplitude $V_{peak}$ of the modulation signal with an amplitude upper limit value $U_{lim2}$ larger than the amplitude lower limit value $L_{lim2}$ by a second threshold $Th_{\Delta Vp2}$, and outputs a fourth comparison result to the bias signal generating circuit 37 as a comparison result between the amplitude $V_{peak}$ and the amplitude upper limit value $U_{lim2}$. $L_{lim2}+Th_{\Delta Vp2}=U_{lim2}$.

Each of the amplitude upper limit value $U_{lim1}$ and the amplitude upper limit value $U_{lim2}$ may be stored in an internal memory of the bias signal generating unit 34 or may be provided from the outside of the bias signal generating unit 34.

In addition, the magnitude relationship between the amplitude upper limit value $U_{lim1}$ and the amplitude upper limit value $U_{lim2}$ is determined by the degree of control stability requirement. When it is necessary to enhance the control stability, the amplitude upper limit value $U_{lim1}$ is desirably a value larger than the amplitude upper limit value $U_{lim2}$.

When the comparison result of the first comparator 35 indicates that the amplitude $V_{peak}$ of the modulation signal is equal to or more than the amplitude lower limit value $L_{lim1}$, and the comparison result of the second comparator 36 indicates that the amplitude $V_{peak}$ of the modulation signal is equal to or less than the amplitude upper limit value $U_{lim1}$, the bias signal generating circuit 37 generates a bias signal indicating the phase bias φP in accordance with the synchronous detection signal output from the synchronous detection circuit 7.

When the comparison result of the first comparator 35 indicates that the amplitude $V_{peak}$ of the modulation signal is smaller than the amplitude lower limit value $L_{lim1}$, the bias signal generating circuit 37 generates a bias signal maintaining the phase bias φP before the amplitude $V_{peak}$ a of the modulation signal becomes smaller than the amplitude lower limit value $L_{lim1}$.

When the comparison result of the second comparator 36 indicates that the amplitude $V_{peak}$ of the modulation signal is larger than the amplitude upper limit value $U_{lim1}$, the bias signal generating circuit 37 generates a bias signal maintaining the phase bias p before the amplitude $V_{peak}$ of the modulation signal becomes larger than the amplitude upper limit value $U_{lim1}$.

After generating the bias signal maintaining the phase bias φP, if the comparison result of the first comparator 35 indicates that the amplitude $V_{peak}$ of the modulation signal is larger than the amplitude lower limit value $L_{lim2}$ and the comparison result of the second comparator 36 indicates that the amplitude $V_{peak}$ of the modulation signal is smaller than the amplitude upper limit value $U_{lim2}$, the bias signal generating circuit 37 restarts the processing of generating the bias signal indicating the phase bias φP in accordance with the synchronous detection signal.

Next, the operation of the optical transmission device shown in FIG. 8 will be described.

Operations other than the bias signal generating unit 34 are similar to those of the optical transmission device illustrated in FIG. 6 and the operations different from those of the optical transmission device illustrated in FIG. 6 will be described.

Figure 9:
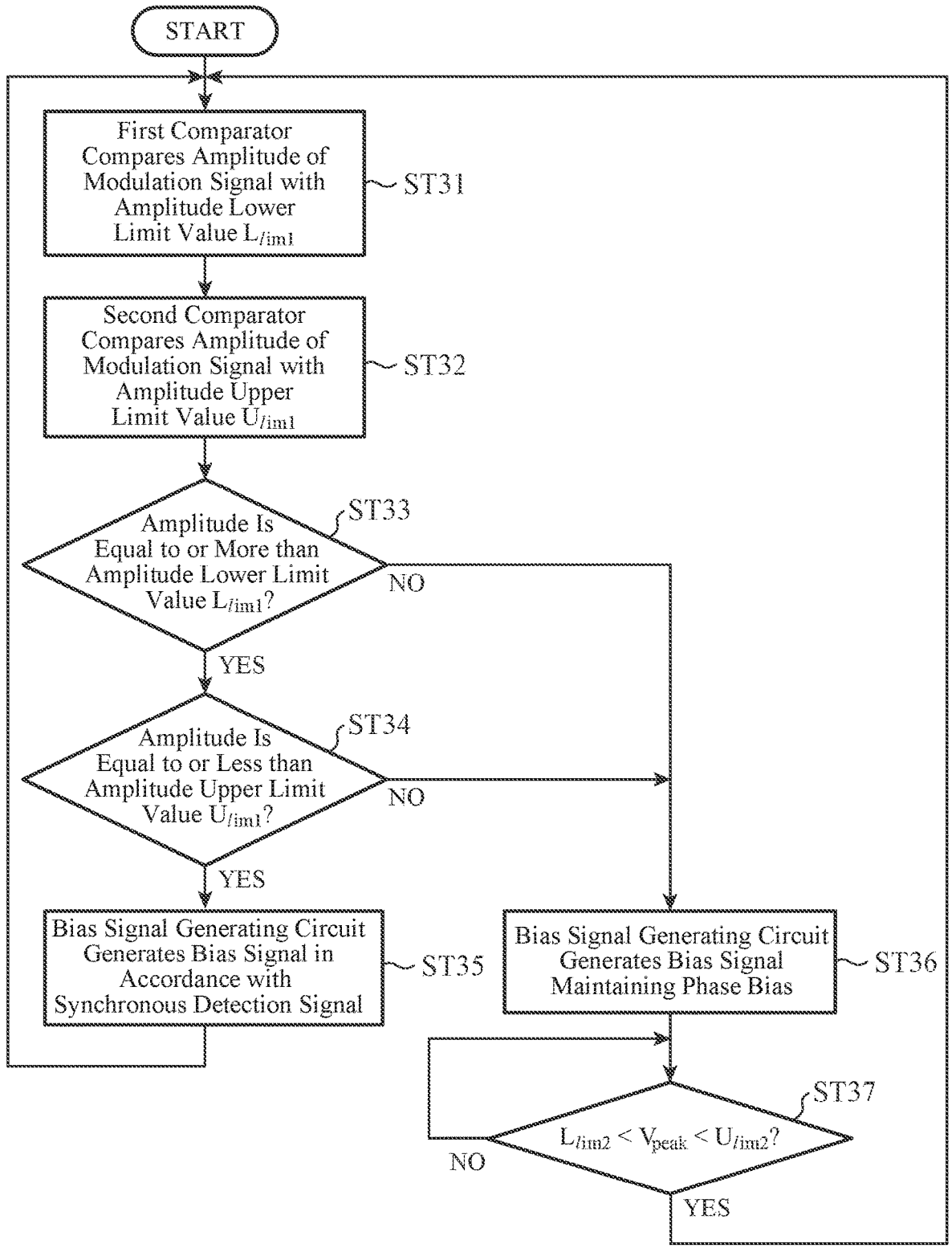
FIG. 9 is a flowchart illustrating a processing procedure of a bias signal generating unit 34.

FIG. 9 is a flowchart illustrating a processing procedure of the bias signal generating unit 34.

The first comparator 35 of the bias signal generating unit 34 compares the amplitude $V_{peak}$ of the modulation signal output from the driver 13 with the amplitude lower limit value $L_{lim1}$ (step ST31 in FIG. 9).

The first comparator 35 outputs a first comparison result to the bias signal generating circuit 37 as a comparison result between the amplitude $V_{peak}$ and the amplitude lower limit value $L_{lim1}$.

The second comparator 36 compares the amplitude $V_{peak}$ of the modulation signal output from the driver 13 with the amplitude upper limit value $U_{lim1}$ (step ST32 in FIG. 9).

The second comparator 36 outputs a third comparison result to the bias signal generating circuit 37 as a comparison result between the amplitude $V_{peak}$ and the amplitude upper limit value $U_{lim1}$.

If the first comparison result of the first comparator 35 indicates that the amplitude $V_{peak}$ of the modulation signal is equal to or more than the amplitude lower limit value $L_{lim1}$ (in the case of YES in step ST33 in FIG. 9), and if the third comparison result of the second comparator 36 indicates that the amplitude $V_{peak}$ of the modulation signal is equal to or less than the amplitude upper limit value $U_{lim1}$ ((in the case of YES in step ST34 in FIG. 9), the bias signal generating circuit 37 generates a bias signal indicating the phase bias φP in accordance with the synchronous detection signal output from the synchronous detection circuit 7 (step ST35 in FIG. 9).

That is, if $L_{lim1} \leq V_{peak} \leq U_{lim1}$ holds, the bias signal generating circuit 37 generates a bias signal indicating the phase bias φP in accordance with the synchronous detection signal output from the synchronous detection circuit 7.

The bias signal generating circuit 37 outputs the generated bias signal to the phase adjustment electrode unit 5.

If the first comparison result of the first comparator 35 indicates that the amplitude $V_{peak}$ of the modulation signal is smaller than the amplitude lower limit value $L_{lim1}$ (in the case of NO in step ST33 in FIG. 9), the bias signal generating circuit 37 generates a bias signal maintaining the phase bias φP before the amplitude $V_{peak}$ of the modulation signal becomes smaller than the amplitude lower limit value $L_{lim1}$ (step ST36 in FIG. 9).

That is, if $V_{peak} < L_{lim1}$ holds, the bias signal generating circuit 37 generates a bias signal maintaining the phase bias φP before the amplitude $V_{peak}$ of the modulation signal becomes smaller than the amplitude lower limit value $L_{lim1}$.

The bias signal generating circuit 37 outputs the generated bias signal to the phase adjustment electrode unit 5.

If the comparison result of the second comparator 36 indicates that the amplitude $V_{peak}$ of the modulation signal is larger than the amplitude upper limit value $U_{lim1}$ (in the case of NO in step ST34 in FIG. 9), the bias signal generating circuit 37 generates a bias signal maintaining the phase bias φP before the amplitude $V_{peak}$ of the modulation signal becomes larger than the amplitude upper limit value $U_{lim1}$ (step ST36 in FIG. 9).

That is, if $V_{peak} > U_{lim1}$ holds, the bias signal generating circuit 33 generates a bias signal maintaining the phase bias φP before the amplitude $V_{peak}$ of the modulation signal becomes larger than the amplitude upper limit value $U_{lim1}$.

The bias signal generating circuit 37 outputs the generated bias signal to the phase adjustment electrode unit 5.

The first comparator 35 compares the amplitude $V_{peak}$ of the modulation signal output from the driver 13 with the amplitude lower limit value $L_{lim2}$.

The first comparator 35 outputs a second comparison result to the bias signal generating circuit 37 as a comparison result between the amplitude $V_{peak}$ and the amplitude lower limit value $L_{lim2}$.

The second comparator 36 compares the amplitude $V_{peak}$ of the modulation signal output from the driver 13 with the amplitude upper limit value $U_{lim2}$.

The second comparator 36 outputs a fourth comparison result to the bias signal generating circuit 37 as a comparison result between the amplitude $V_{peak}$ and the amplitude upper limit value $U_{lim2}$.

After generating the bias signal maintaining the phase bias φP, if the second comparison result of the first comparator 35 indicates that the amplitude $V_{peak}$ of the modulation signal is larger than the amplitude lower limit value $L_{lim2}$ and the fourth comparison result of the second comparator 36 indicates that the amplitude $V_{peak}$ of the modulation signal is smaller than the amplitude upper limit value $U_{lim2}$ (in the case of YES in step ST37 in FIG. 9), the bias signal generating circuit 37 restarts the processing of generating the bias signal indicating the phase bias φP in accordance with the synchronous detection signal.

After generating the bias signal maintaining the phase bias φP, if the second comparison result of the first comparator 35 indicates that the amplitude $V_{peak}$ of the modulation signal is equal to or less than the amplitude lower limit value $L_{lim2}$, or the fourth comparison result of the second comparator 36 indicates that the amplitude $V_{peak}$ of the modulation signal is equal to or more than the amplitude upper limit value $U_{lim2}$ (in the case of NO in step ST37 in FIG. 9), the bias signal generating circuit 37 does not restart the processing of generating the bias signal indicating the phase bias φP in accordance with the synchronous detection signal.

In the fourth embodiment described above, the optical transmission device illustrated in FIG. 8 is configured so that the bias signal generating unit 34 generates the bias signal maintaining the phase bias before the range of the change in the amplitude of the modulation signal becomes larger than the first threshold, then monitors the change in the amplitude of the modulation signal, and restarts the processing of generating the bias signal in accordance with the synchronous detection signal when the range of the change is smaller than the second threshold. Therefore, similarly to the optical transmission device illustrated in FIG. 1, the optical transmission device illustrated in FIG. 8 can suppress the deterioration of the modulated light after the phase adjustment by the IQ optical modulator 1 even if the result of the synchronous detection becomes temporally discontinuous. In addition, it is possible to automatically restart the processing of generating the bias signal in accordance with the synchronous detection signal.

Fifth Embodiment

In a fifth embodiment, an optical transmission device will be described in which a bias signal generating circuit 45 generates each of a first bias signal indicating the phase bias φI used for phase adjustment by the first Mach-Zehnder interferometer 3 and a second bias signal indicating the phase bias φQ used for phase adjustment by the second Mach-Zehnder interferometer 4.

Figure 10:
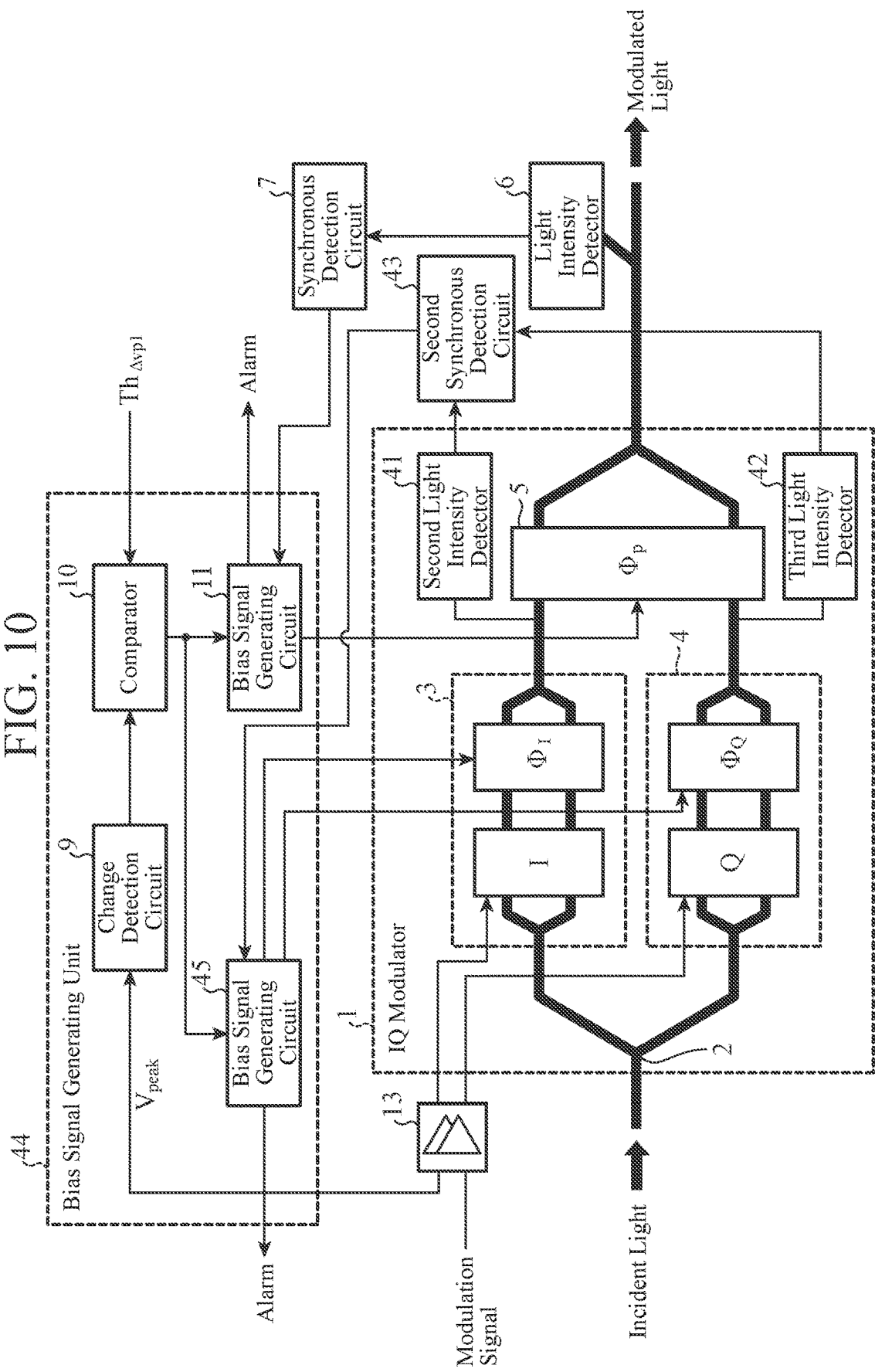
FIG. 10 is a configuration diagram illustrating an optical transmission device according to a fifth embodiment.

FIG. 10 is a configuration diagram illustrating an optical transmission device according to the fifth embodiment. In FIG. 10, the same reference numerals as those in FIG. 1 denote the same or corresponding parts, and thus description thereof is omitted.

In the optical transmission device illustrated in FIG. 10, the light intensity detector 6 is a first light intensity detector, and the synchronous detection circuit 7 is a first synchronous detection circuit.

A second light intensity detector 41 is implemented by, for example, a photodetector.

The second light intensity detector 41 detects the light intensity of the modulated light output from the first Mach-Zehnder interferometer 3, and outputs a light intensity signal indicating the light intensity of the modulated light to a second synchronous detection circuit 43 described later. The light intensity signal is an electric signal.

A third light intensity detector 42 is implemented by, for example, a photodetector.

The third light intensity detector 42 detects the light intensity of the modulated light output from the second Mach-Zehnder interferometer 4, and outputs a light intensity signal indicating the light intensity of the modulated light to the second synchronous detection circuit 43. The light intensity signal is an electric signal.

The second synchronous detection circuit 43 is implemented by, for example, an automatic bias control circuit.

The second synchronous detection circuit 43 performs synchronous detection of a light intensity signal indicating the light intensity detected by the second light intensity detector 41 and a dither signal oscillated from a first dither signal source, and outputs a first synchronous detection signal indicating a result of the synchronous detection to the bias signal generating circuit 45.

For example, the first dither signal source may be built in the second synchronous detection circuit 43, or may be provided outside the second synchronous detection circuit 43. In addition, the first dither signal source may be, for example, the same dither signal source as the dither signal source built in the synchronous detection circuit 7.

In addition, the second synchronous detection circuit 43 performs synchronous detection of a light intensity signal indicating the light intensity detected by the third light intensity detector 42 and a dither signal oscillated from the second dither signal source, and outputs a second synchronous detection signal indicating a result of the synchronous detection to the bias signal generating circuit 45.

For example, the second dither signal source may be built in the second synchronous detection circuit 43, or may be provided outside the second synchronous detection circuit 43.

A bias signal generating unit 44 includes a change detection circuit 9, a comparator 10, the bias signal generating circuit 11, and a bias signal generating circuit 45.

When the comparison result of the comparator 10 indicates that the change amount $\Delta V_{peak}$ is equal to or less than the first threshold $Th_{\Delta Vp1}$, the bias signal generating circuit 45 generates a first bias signal indicating the phase bias φI used for phase adjustment by the first Mach-Zehnder interferometer 3 in accordance with the first synchronous detection signal output from the second synchronous detection circuit 43.

When the comparison result of the comparator 10 indicates that the change amount $\Delta V_{peak}$ is larger than the first threshold $Th_{\Delta Vp1}$, the bias signal generating circuit 45 generates the first bias signal maintaining the phase bias φI before the change amount $\Delta V_{peak}$ becomes larger than the first threshold $Th_{\Delta Vp1}$. The phase bias φI before the change amount $\Delta V_{peak}$ becomes larger than the first threshold $Th_{\Delta Vp1}$ is, for example, the phase bias φI immediately before the change amount $\Delta V_{peak}$ becomes larger than the first threshold $Th_{\Delta Vp1}$ among the one or more phase biases φI when the change amount $\Delta V_{peak}$ is equal to or less than the first threshold $Th_{\Delta Vp1}$. However, this is merely an example, and if there is no practical problem, the phase bias φI may be the phase bias φI that is, for example, one sampling or two sampling before the phase bias φI immediately before the change amount $\Delta V_{peak}$ becomes larger than the first threshold $Th_{\Delta Vp1}$.

The bias signal generating circuit 45 outputs the generated first bias signal to the first Mach-Zehnder interferometer 3.

When the comparison result of the comparator 10 indicates that the change amount $\Delta V_{peak}$ is equal to or less than the first threshold $Th_{\Delta Vp1}$, the bias signal generating circuit 45 generates a second bias signal indicating the phase bias φQ used for phase adjustment by the second Mach-Zehnder interferometer 4 in accordance with the second synchronous detection signal output from the second synchronous detection circuit 43.

When the comparison result of the comparator 10 indicates that the change amount $\Delta V_{peak}$ is larger than the first threshold $Th_{\Delta Vp1}$, the bias signal generating circuit 45 generates the second bias signal maintaining the phase bias φQ before the change amount $\Delta V_{peak}$ becomes larger than the first threshold $Th_{\Delta Vp1}$. The phase bias φQ before the change amount $\Delta V_{peak}$ becomes larger than the first threshold $Th_{\Delta Vp1}$ is, for example, the phase bias φQ immediately before the change amount $\Delta V_{peak}$ becomes larger than the first threshold $Th_{\Delta Vp1}$ among the one or more phase biases φQ when the change amount $\Delta V_{peak}$ is equal to or less than the first threshold $Th_{\Delta Vp1}$. However, this is merely an example, and if there is no practical problem, the phase bias φQ may be the phase bias φQ that is, for example, one sampling or two sampling before the phase bias φQ immediately before the change amount $\Delta V_{peak}$ becomes larger than the first threshold $Th_{\Delta Vp1}$.

The bias signal generating circuit 45 outputs the generated second bias signal to the second Mach-Zehnder interferometer 4.

When the comparison result of the comparator 10 indicates that the change amount $\Delta V_{peak}$ is larger than the first threshold $Th_{\Delta Vp1}$, the bias signal generating circuit 45 outputs an alarm to the outside of the device.

In the optical transmission device illustrated in FIG. 10, the second light intensity detector 41, the third light intensity detector 42, the second synchronous detection circuit 43, and the bias signal generating unit 44 are applied to the optical transmission device illustrated in FIG. 1. However, this is merely an example, and the second light intensity detector 41, the third light intensity detector 42, the second synchronous detection circuit 43, and the bias signal generating unit 44 may be applied to the optical transmission device illustrated in FIG. 4, the optical transmission device illustrated in FIG. 6, or the optical transmission device illustrated in FIG. 8.

Next, the operation of the optical transmission device shown in FIG. 10 will be described.

Operations other than those of the second light intensity detector 41, the third light intensity detector 42, the second synchronous detection circuit 43, and the bias signal generating circuit 45 are similar to those of the optical transmission device illustrated in FIG. 1, and the operations different from those of the optical transmission device illustrated in FIG. 1 will be described.

The second light intensity detector 41 acquires a part of the multiplexed modulated light output from the first Mach-Zehnder interferometer 3, and detects the light intensity of the multiplexed modulated light.

The second light intensity detector 41 outputs a light intensity signal indicating the detected light intensity to the second synchronous detection circuit 43.

The second synchronous detection circuit 43 performs synchronous detection of a light intensity signal indicating the light intensity detected by the second light intensity detector 41 and a dither signal oscillated from a first dither signal source, and outputs a first synchronous detection signal indicating a result of the synchronous detection to the bias signal generating circuit 45.

The synchronous detection process of the second synchronous detection circuit 43 is a synchronous detection process similar to that of the synchronous detection circuit 7.

The third light intensity detector 42 acquires a part of the multiplexed modulated light output from the second Mach-Zehnder interferometer 4, and detects the light intensity of the multiplexed modulated light.

The third light intensity detector 42 outputs a light intensity signal indicating the detected light intensity to the second synchronous detection circuit 43.

The second synchronous detection circuit 43 performs synchronous detection of the light intensity signal indicating the light intensity detected by the third light intensity detector 42 and the dither signal oscillated from a second dither signal source, and outputs a second synchronous detection signal indicating a result of the synchronous detection to the bias signal generating circuit 45.

When the comparison result of the comparator 10 indicates that the change amount $\Delta V_{peak}$ is equal to or less than the first threshold $Th_{\Delta Vp1}$, the bias signal generating circuit 45 generates a first bias signal indicating the phase bias φI in accordance with the first synchronous detection signal output from the second synchronous detection circuit 43.

The bias signal generating circuit 45 outputs the generated first bias signal to the first Mach-Zehnder interferometer 3.

In addition, when the comparison result of the comparator 10 indicates that the change amount $\Delta V_{peak}$; is equal to or less than the first threshold $Th_{\Delta Vp1}$, the bias signal generating circuit 45 generates a second bias signal indicating the phase bias φQ in accordance with the second synchronous detection signal output from the second synchronous detection circuit 43.

The bias signal generating circuit 45 outputs the generated second bias signal to the second Mach-Zehnder interferometer 4.

As long as the bias signal with which the synchronous detection signal becomes 0 can be generated on the basis of the synchronous detection signal, any method may be used as a method of generating the bias signal. For example, a method can be used in which the bias signal generating circuit 45 generates the bias signal by adding the synchronous detection signal and the dither signal.

When the comparison result of the comparator 10 indicates that the change amount $\Delta V_{peak}$ is larger than the first threshold $Th_{\Delta Vp1}$, the bias signal generating circuit 45 generates the first bias signal maintaining the phase bias φI before the change amount $\Delta V_{peak}$ becomes larger than the first threshold $Th_{\Delta Vp1}$.

The bias signal generating circuit 45 outputs the generated first bias signal to the first Mach-Zehnder interferometer 3.

In addition, when the comparison result of the comparator 10 indicates that the change amount $\Delta V_{peak}$ is larger than the first threshold $Th_{\Delta Vp1}$, the bias signal generating circuit 45 generates a second bias signal maintaining the phase bias φQ before the change amount $\Delta V_{peak}$ becomes larger than the first threshold $Th_{\Delta Vp1}$.

The bias signal generating circuit 45 outputs the generated second bias signal to the second Mach-Zehnder interferometer 4.

In a case w % here the change amount $\Delta V_{peak}$ is larger than the first threshold $Th_{\Delta Vp1}$, there is a possibility that a situation such as a change in the modulation format of the modulation signal has occurred. Therefore, the result of synchronous detection by the second synchronous detection circuit 43 becomes temporally discontinuous. As a result, there is a possibility that each of the phase bias φI indicated by the first bias signal generated in accordance with the first synchronous detection signal and the phase bias φQ indicated by the second bias signal generated in accordance with the second synchronous detection signal is adjusted in a wrong direction by the bias signal generating circuit 45, and the output signal of the IQ optical modulator 1 is deteriorated.

However, when the change amount $\Delta V_{peak}$ is larger than the first threshold $Th_{\Delta Vp1}$, each of the phase bias φI indicated by the first bias signal generated by the bias signal generating circuit 45 and the phase bias φQ indicated by the second bias signal is the same as the phase bias before the change amount $\Delta V_{peak}$ becomes larger than the first threshold $Th_{\Delta Vp1}$. Therefore, it is possible to suppress deterioration of the output signal of the IQ optical modulator 1 due to adjustment of each of the phase bias φI indicated by the first bias signal generated by the bias signal generating circuit 45 and the phase bias φQ indicated by the second bias signal to the wrong direction.

In addition, when the comparison result of the comparator 10 indicates that the change amount $\Delta V_{peak}$ is larger than the first threshold $Th_{\Delta Vp1}$, the bias signal generating circuit 45 outputs an alarm to the outside of the device.

As a result, the user of the optical transmission device illustrated in FIG. 10 or the external device of the optical transmission device illustrated in FIG. 10 can recognize that the automatic bias control for generating each of the first bias signal and the second bias signal in accordance with each of the first bias signal and the second bias signal output from the second synchronous detection circuit 43 is stopped.

The bias signal generating circuit 45 generates a bias signal maintaining each of the phase bias φI and the phase bias φQ, and then starts processing of receiving an instruction to generate each of the first bias signal and the second bias signal from the outside of the device in accordance with each of the first synchronous detection signal and the second synchronous detection signal.

When an instruction to generate the bias signal in accordance with the synchronous detection signal is given from the outside of the device, the bias signal generating circuit 45 stops the output of the alarm and restarts the processing of generating each of the first bias signal and the second bias signal in accordance with each of the first synchronous detection signal and the second synchronous detection signal.

When the instruction to generate the bias signal in accordance with the synchronous detection signal is not given from the outside of the device, the bias signal generating circuit 45 continues the processing of receiving instruction without restarting the processing of generating each of the first bias signal and the second bias signal in accordance with each of the first synchronous detection signal and the second synchronous detection signal.

In the fifth embodiment, the optical transmission device is configured so that the bias signal generating circuit 45 generates a first bias signal indicating a phase bias used for phase adjustment by the first Mach-Zehnder interferometer 3 in accordance with the first synchronous detection signal output from the second synchronous detection circuit 43 when a range of change is equal to or less than the first threshold, generates a second bias signal indicating a phase bias used for phase adjustment by the second Mach-Zehnder interferometer 4 in accordance with the second synchronous detection signal output from the second synchronous detection circuit 43, generates a first bias signal maintaining a phase bias before the range of the change becomes larger than the first threshold as the first bias signal when the range of the change is larger than the first threshold, and generates a second bias signal maintaining a phase bias before the range of the change becomes larger than the first threshold as the second bias signal. Therefore, the optical transmission device can suppress the deterioration of the modulated light after the phase adjustment by the IQ optical modulator 1 even if the result of the synchronous detection becomes temporally discontinuous.

Sixth Embodiment

In a sixth embodiment, an optical transmission device in which a first quadrature optical modulator (hereinafter, referred to as a "first IQ optical modulator") 1-1 and a second quadrature optical modulator (hereinafter, referred to as a "second IQ optical modulator") 1-2 are connected in parallel will be described.

Figure 11:
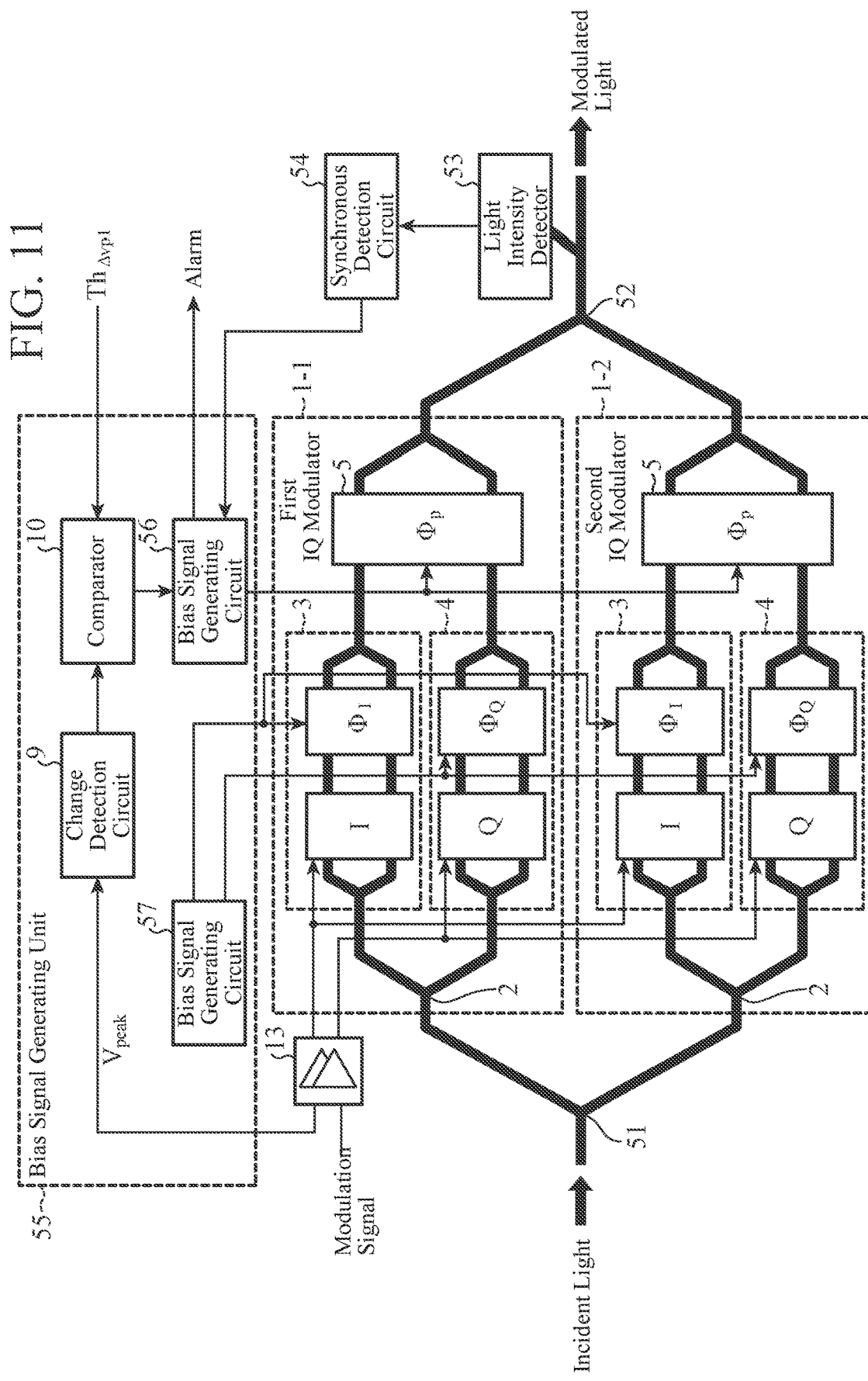
FIG. 11 is a configuration diagram illustrating an optical transmission device according to a sixth embodiment.

FIG. 11 is a configuration diagram illustrating an optical transmission device according to the sixth embodiment. In FIG. 11, the same reference numerals as those in FIG. 1 denote the same or corresponding parts, and thus description thereof is omitted.

Each of the first IQ optical modulator 1-1 and the second IQ optical modulator 1-2 is an IQ optical modulator having the same configuration as that of the IQ optical modulator 1 illustrated in FIG. 1.

The first IQ optical modulator 1-1 and the second IQ optical modulator 1-2 are connected in parallel to each other.

In the optical transmission device illustrated in FIG. 11, the first IQ optical modulator 1-1 and the second IQ optical modulator 1-2 are applied to the optical transmission device illustrated in FIG. 1. However, this is merely an example, and the first IQ optical modulator 1-1 and the second IQ optical modulator 1-2 may be applied to the optical transmission device illustrated in FIG. 4, the optical transmission device illustrated in FIG. 6, the optical transmission device illustrated in FIG. 8, or the optical transmission device illustrated in FIG. 10.

A branch portion 51 branches the incident light into two light beams, outputs one of the two branched light beams to the first IQ optical modulator 1-1, and outputs the other light beam to the second IQ optical modulator 1-2.

A multiplexing portion 52 multiplexes the modulated light beam output from the first IQ optical modulator 1-1 and the modulated light beam output from the second IQ optical modulator 1-2, and outputs the multiplexed modulated light to the outside of the device.

A light intensity detector 53 is implemented by, for example, a photodetector.

The light intensity detector 53 detects light intensity of the modulated light multiplexed by the multiplexing portion 52, and outputs a light intensity signal indicating the light intensity of the modulated light to a synchronous detection circuit 54 described later. The light intensity signal is an electric signal.

The synchronous detection circuit 54 is implemented by, for example, an automatic bias control circuit.

The synchronous detection circuit 54 performs synchronous detection of a light intensity signal indicating the light intensity detected by the light intensity detector 53 and a dither signal.

The synchronous detection circuit 54 outputs a synchronous detection signal indicating a result of the synchronous detection to a bias signal generating unit 55 described later.

The dither signal is a regular signal such as a sine wave or a triangular wave. The dither signal source that oscillates the dither signal may be provided outside the synchronous detection circuit 54 or may be built in the synchronous detection circuit 54.

The bias signal generating unit 55 includes a change detection circuit 9, a comparator 10, a bias signal generating circuit 56, and a bias signal generating circuit 57.

The bias signal generating unit 55 monitors a change in the amplitude $V_{peak}$ of the modulation signal output from the driver 13.

When a range of the change is equal to or less than the first threshold $Th_{\Delta V_{p1}}$, the bias signal generating unit 55 generates a bias signal in accordance with the synchronous detection signal output from the synchronous detection circuit 54.

When the range of the change is larger than the first threshold $Th_{\Delta V_{p1}}$, the bias signal generating unit 55 generates a bias signal maintaining the phase bias before the range of the change becomes larger than the first threshold $Th_{\Delta V_{p1}}$.

When the range of the change is larger than the first threshold $Th_{\Delta V_{p1}}$, the bias signal generating unit 55 outputs an alarm to the outside of the device.

The bias signal generating unit 55 outputs the generated bias signal to each of the first IQ optical modulator 1-1 and the second IQ optical modulator 1-2.

The first threshold $Th_{\Delta V_{p1}}$ may be stored in an internal memory of the bias signal generating unit 55 or may be given from the outside of the bias signal generating unit 55.

When the comparison result of the comparator 10 indicates that the change amount $\Delta V_{peak}$ is equal to or less than the first threshold $Th_{\Delta V_{p1}}$, the bias signal generating circuit 56 generates a bias signal in accordance with the synchronous detection signal output from the synchronous detection circuit 54.

When the comparison result of the comparator 10 indicates that the change amount $\Delta V_{peak}$ is larger than the first threshold $Th_{\Delta V_{p1}}$, the bias signal generating circuit 56 generates a bias signal maintaining the phase bias before the change amount $\Delta V_{peak}$ becomes larger than the first threshold $Th_{\Delta V_{p1}}$.

The bias signal generating circuit 56 outputs the generated bias signal to the phase adjustment electrode unit 5 in each of the first IQ optical modulator 1-1 and the second IQ optical modulator 1-2.

When the comparison result of the comparator 10 indicates that the change amount $\Delta V_{peak}$ is larger than the first threshold $Th_{\Delta V_{p1}}$, the bias signal generating circuit 56 outputs an alarm to the outside of the device.

The bias signal generating circuit 57 generates a bias signal for Ich indicating the phase bias φI, and outputs the bias signal for Ich to the first Mach-Zehnder interferometer 3 in each of the first IQ optical modulator 1-1 and the second IQ optical modulator 1-2.

Further, the bias signal generating circuit 57 generates a bias signal for Qch indicating the phase bias φQ. and outputs the bias signal for Qch to the second Mach-Zehnder interferometer 4 in each of the first IQ optical modulator 1-1 and the second IQ optical modulator 1-2.

Next, the operation of the optical transmission device shown in FIG. 11 will be described.

A branch portion 51 branches the incident light into two light beams, outputs one of the two branched light beams to the first IQ optical modulator 1-1, and outputs the other light beam to the second IQ optical modulator 1-2.

When the light beam output from the branch portion 51 is incident, the first IQ optical modulator 1-1 operates similarly to the IQ optical modulator 1 illustrated in FIG. 1 and outputs modulated light beam that is the light beam after phase adjustment to the multiplexing portion 52.

When the light beam output from the branch portion 51 is incident, the second IQ optical modulator 1-2 operates similarly to the IQ optical modulator 1 illustrated in FIG. 1, and outputs modulated light beam that is the light beam after phase adjustment to the multiplexing portion 52.

The multiplexing portion 52 multiplexes the modulated light beam output from the first IQ optical modulator 1-1 and the modulated light beam output from the second IQ optical modulator 1-2, and outputs the multiplexed modulated light to the outside of the device.

The light intensity detector 53 acquires a part of the modulated light after the multiplexing by the multiplexing portion 52 and detects the light intensity of the modulated light after the multiplexing.

The light intensity detector 53 outputs a light intensity signal indicating the detected light intensity to the synchronous detection circuit 54.

The synchronous detection circuit 54 performs synchronous detection of a light intensity signal indicating the light intensity detected by the light intensity detector 53 and a dither signal.

The synchronous detection circuit 54 outputs a synchronous detection signal indicating a result of the synchronous detection to the bias signal generating circuit 56 of the bias signal generating unit 55.

The synchronous detection process of the synchronous detection circuit 54 is a synchronous detection process similar to that of the synchronous detection circuit 7 illustrated in FIG. 1.

The change detection circuit 9 of the bias signal generating unit 8 monitors a change in the amplitude $V_{peak}$ of the modulation signal output from the driver 13.

The change detection circuit 9 outputs a signal indicating a change amount $\Delta V_{peak}$ which is a range of change of the amplitude $V_{peak}$ to the comparator 10.

The comparator 10 compares the change amount $\Delta V_{peak}$ indicated by the output signal of the change detection circuit 9 with the first threshold $Th_{\Delta V_{p1}}$.

The comparator 10 outputs a comparison result between the change amount $\Delta V_{peak}$ and the first threshold $Th_{\Delta V_{p1}}$ to the bias signal generating circuit 56.

When the comparison result of the comparator 10 indicates that the change amount $\Delta V_{peak}$ is equal to or less than the first threshold $Th_{\Delta V_{p1}}$, the bias signal generating circuit 56 generates a bias signal indicating the phase bias φP in accordance with the synchronous detection signal output from the synchronous detection circuit 54.

The bias signal generating circuit 56 outputs the generated bias signal to the phase adjustment electrode unit 5 in each of the first IQ optical modulator 1-1 and the second IQ optical modulator 1-2.

The phase adjustment electrode unit 5 in each of the first IQ optical modulator 1-1 and the second IQ optical modulator 1-2 adjusts the phase of the modulated light output from the first Mach-Zehnder interferometer 3 and the phase of the modulated light output from the second Mach-Zehnder interferometer 4 with the phase bias φP indicated by the bias signal output from the bias signal generating circuit 11.

If the phase bias φP indicated by the bias signal output from the bias signal generating circuit 56 is an appropriate phase bias, the phase difference between each modulated light beams after the phase adjustment by the phase adjustment electrode unit 5 becomes $\pi/2$.

When the comparison result of the comparator 10 indicates that the change amount $\Delta V_{peak}$ is larger than the first threshold $Th_{\Delta V_{p1}}$, the bias signal generating circuit 56 generates a bias signal maintaining the phase bias φP before the change amount $\Delta V_{peak}$ becomes larger than the first threshold $Th_{\Delta V_{p1}}$.

The bias signal generating circuit 56 outputs the generated bias signal to the phase adjustment electrode unit 5 in each of the first IQ optical modulator 1-1 and the second IQ optical modulator 1-2.

In a case where the change amount $\Delta V_{peak}$ is larger than the first threshold $Th_{\Delta V_{p1}}$, there is a possibility that a situation such as a change in the modulation format of the modulation signal has occurred. Therefore, there is a possibility that the result of the synchronous detection by the synchronous detection circuit 54 becomes temporally discontinuous, and as a result, the phase bias φP indicated by the bias signal generated in accordance with the synchronous detection signal is adjusted in the wrong direction by the bias signal generating circuit 56, and each output signals of the first IQ optical modulator 1-1 and the second IQ optical modulator 1-2 are degraded.

However, when the change amount $\Delta V_{peak}$ is larger than the first threshold $Th_{\Delta V_{p1}}$, the phase bias φP indicated by the bias signal generated by the bias signal generating circuit 56 is the same as the phase bias before the change amount $\Delta V_{peak}$ becomes larger than the first threshold $Th_{\Delta V_{p1}}$. Therefore, it is possible to suppress deterioration of the output signals of the first IQ optical modulator 1-1 and the second IQ optical modulator 1-2 due to adjustment of the phase bias φP indicated by the bias signal generated by the bias signal generating circuit 56 in the wrong direction.

In addition, when the comparison result of the comparator 10 indicates that the change amount $\Delta V_{peak}$ is larger than the first threshold $Th_{\Delta V_{p1}}$, the bias signal generating circuit 56 outputs an alarm to the outside of the device.

As a result, the user of the optical transmission device illustrated in FIG. 11 or the external device of the optical transmission device illustrated in FIG. 11 can recognize that the automatic bias control for generating the bias signal in accordance with the synchronous detection signal output from the synchronous detection circuit 54 is stopped.

After generating the bias signal maintaining the phase bias φP, the bias signal generating circuit 56 starts processing of receiving an instruction to generate the bias signal in accordance with the synchronous detection signal from the outside of the device.

When an instruction to generate the bias signal in accordance with the synchronous detection signal is given from the outside of the device, the bias signal generating circuit 56 stops the output of the alarm and restarts the processing of generating the bias signal in accordance with the synchronous detection signal.

When the instruction to generate the bias signal in accordance with the synchronous detection signal is not given from the outside of the device, the bias signal generating circuit 56 continues the processing of receiving instruction without restarting the processing of generating the bias signal in accordance with the synchronous detection signal.

As described above, even in the optical transmission device in which the first IQ optical modulator 1-1 and the second IQ optical modulator 1-2 are connected in parallel, it is possible to suppress the deterioration of the modulated light after the phase adjustment in each of the first IQ optical modulator 1-1 and the second IQ optical modulator 1-2 even if the result of the synchronous detection becomes temporally discontinuous.

Seventh Embodiment

In a seventh embodiment, an optical transmission device will be described in which the bias signal generating circuit 47 generates each of a first bias signal indicating the phase bias φI used for phase adjustment by the first Mach-Zehnder interferometer 3 and a second bias signal indicating the phase bias φQ used for phase adjustment by the second Mach-Zehnder interferometer 4.

Figure 12:
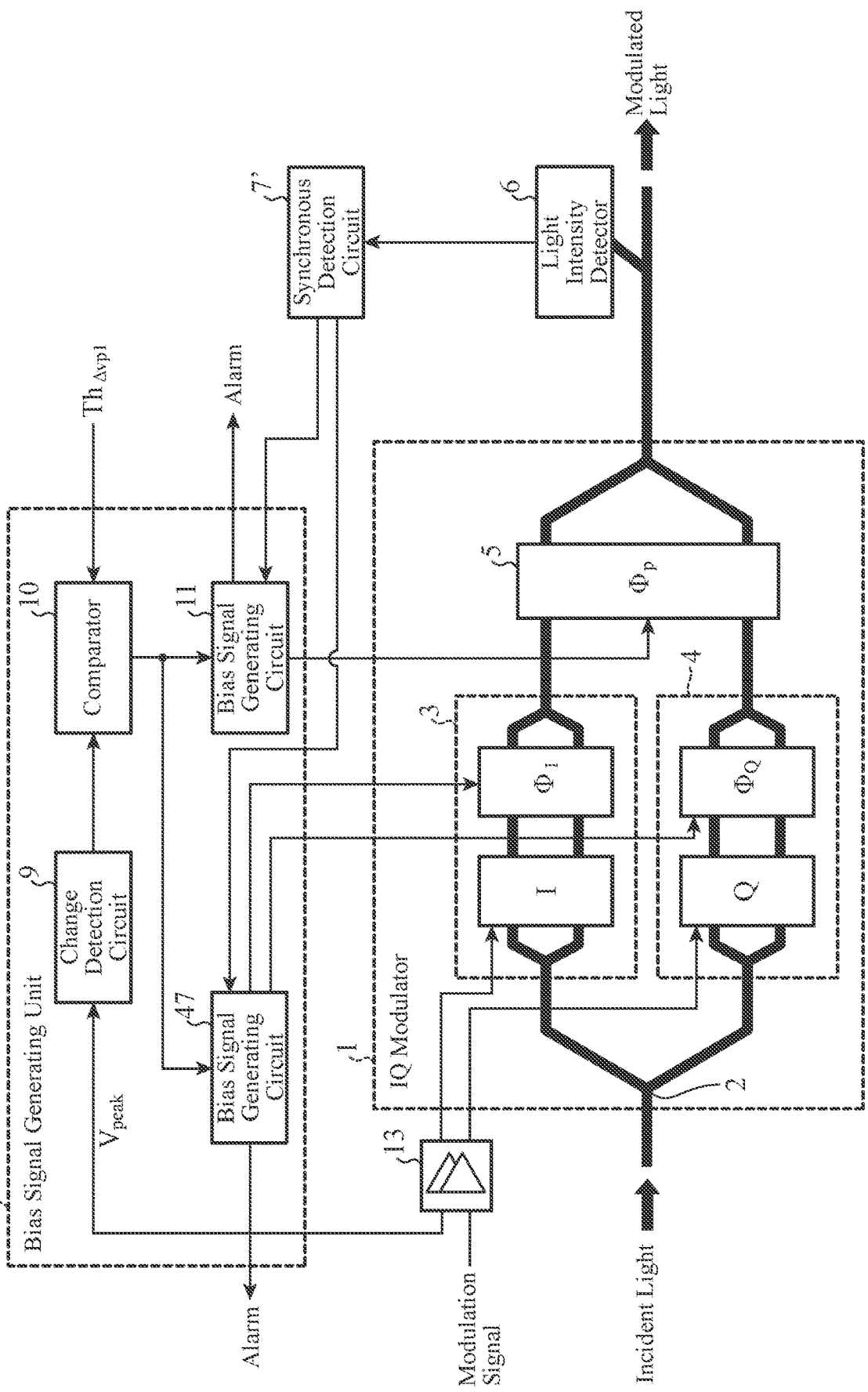
FIG. 12 is a configuration diagram illustrating an optical transmission device according to a seventh embodiment.

FIG. 12 is a configuration diagram illustrating an optical transmission device according to the seventh embodiment. In FIG. 12, the same reference numerals as those in FIG. 1 denote the same or corresponding parts, and thus description thereof is omitted.

A synchronous detection circuit 7' is implemented by, for example, an automatic bias control circuit.

The synchronous detection circuit 7' performs synchronous detection of a light intensity signal indicating the light intensity detected by the light intensity detector 6 and a dither signal.

The synchronous detection circuit 7' outputs a synchronous detection signal indicating a result of the synchronous detection to both the bias signal generating circuit 11 and the bias signal generating circuit 47.

The dither signal source that oscillates the dither signal may be provided outside the synchronous detection circuit 7' or may be built in the synchronous detection circuit 7'.

The optical transmission device illustrated in FIG. 12 includes a synchronous detection circuit 7' to output a synchronization signal to each of the bias signal generating circuit 11 and the bias signal generating circuit 47. However, this is merely an example, and the optical transmission device may include, for example, two synchronous detection circuits similar to the synchronous detection circuit 7 illustrated in FIG. 1 instead of the synchronous detection circuit 7'.

At this time, one of the two synchronous detection circuits outputs the synchronization signal to the bias signal generating circuit 11, and the other synchronous detection circuit outputs the synchronization signal to the bias signal generating circuit 47. Note that the dither signals used by the two synchronous detection circuits may be the same dither signal or different dither signals.

The bias signal generating unit 46 includes a change detection circuit 9, a comparator 10, a bias signal generating circuit 11, and a bias signal generating circuit 47.

When the comparison result of the comparator 10 indicates that the change amount $\Delta V_{peak}$ is equal to or less than the first threshold $Th_{\Delta Vp1}$, the bias signal generating circuit 47 generates a first bias signal indicating the phase bias φI used for phase adjustment by the first Mach-Zehnder interferometer 3 in accordance with the synchronous detection signal output from the synchronous detection circuit 7'.

Further, when the comparison result of the comparator 10 indicates that the change amount $\Delta V_{peak}$ is equal to or less than the first threshold $Th_{\Delta Vp1}$, the bias signal generating circuit 47 generates a second bias signal indicating the phase bias φQ used for phase adjustment by the second Mach-Zehnder interferometer 4 in accordance with the synchronous detection signal output from the synchronous detection circuit 7'.

When the comparison result of the comparator 10 indicates that the change amount $\Delta V_{peak}$ is larger than the first threshold $Th_{\Delta Vp1}$, the bias signal generating circuit 47 generates a first bias signal maintaining the phase bias qi before the change amount $\Delta V_{peak}$ becomes larger than the first threshold $Th_{\Delta Vp1}$. However, this is merely an example, and if there is no practical problem, the phase bias φI may be the phase bias 91 that is, for example, one sampling or two sampling before the phase bias (pi immediately before the change amount $\Delta V_{eak}$ becomes larger than the first threshold $Th_{\Delta Vp1}$.

In addition, when the comparison result of the comparator 10 indicates that the change amount $\Delta V_{peak}$ is larger than the first threshold $Th_{\Delta Vp1}$, the bias signal generating circuit 47 generates a second bias signal maintaining the phase bias φQ before the change amount $\Delta V_{peak}$ becomes larger than the first threshold $Th_{\Delta Vp1}$. However, this is merely an example, and if there is no practical problem, the phase bias φQ may be the phase bias φQ that is, for example, one sampling or two sampling before the phase bias φQ immediately before the change amount $\Delta V_{peak}$ becomes larger than the first threshold $Th_{\Delta Vp1}$.

The bias signal generating circuit 47 outputs the generated first bias signal to the first Mach-Zehnder interferometer 3, and outputs the generated second bias signal to the second Mach-Zehnder interferometer 4.

When the comparison result of the comparator 10 indicates that the change amount $\Delta V_{peak}$ is larger than the first threshold $Th_{\Delta Vp1}$, the bias signal generating circuit 47 outputs an alarm to the outside of the device.

In the optical transmission device illustrated in FIG. 12, the synchronous detection circuit 7' and the bias signal generating unit 46 are applied to the optical transmission device illustrated in FIG. 1. However, this is merely an example, and the synchronous detection circuit 7' and the bias signal generating unit 46 may be applied to the optical transmission device illustrated in FIG. 4, the optical transmission device illustrated in FIG. 6, the optical transmission device illustrated in FIG. 8, or the optical transmission device illustrated in FIG. 10.

Next, the operation of the optical transmission device shown in FIG. 12 will be described.

Operations other than the synchronous detection circuit 7' and the bias signal generating unit 46 are similar to those of the optical transmission device illustrated in FIG. 1 and the operations different from those of the optical transmission device illustrated in FIG. 1 will be described.

Similarly to the synchronous detection circuit 7 illustrated in FIG. 1, the synchronous detection circuit 7' performs synchronous detection of a light intensity signal indicating the light intensity detected by the light intensity detector 6 and a dither signal.

The synchronous detection circuit 7' outputs a synchronous detection signal indicating a result of the synchronous detection to both the bias signal generating circuit 11 and the bias signal generating circuit 47.

When the comparison result of the comparator 10 indicates that the change amount $\Delta V_{peak}$ is equal to or less than the first threshold $Th_{\Delta Vp1}$, the bias signal generating circuit 47 generates a first bias signal indicating the phase bias φI used for phase adjustment by the first Mach-Zehnder interferometer 3 in accordance with the synchronous detection signal output from the synchronous detection circuit 7'.

The bias signal generating circuit 47 outputs the generated first bias signal to the first Mach-Zehnder interferometer 3.

As long as the first bias signal with which the synchronous detection signal becomes 0 can be generated on the basis of the synchronous detection signal, any method can be used as a method of generating the first bias signal. For example, a method in which the bias signal generating circuit 47 generates the first bias signal by adding the synchronous detection signal and the dither signal can be used.

Further, when the comparison result of the comparator 10 indicates that the change amount $\Delta V_{peak}$ is equal to or less than the first threshold $Th_{\Delta Vp1}$, the bias signal generating circuit 47 generates a second bias signal indicating the phase bias φQ used for phase adjustment by the second Mach-Zehnder interferometer 4 in accordance with the synchronous detection signal output from the synchronous detection circuit 7'.

The bias signal generating circuit 47 outputs the generated second bias signal to the second Mach-Zehnder interferometer 4.

As long as the second bias signal with which the synchronous detection signal becomes 0 can be generated on the basis of the synchronous detection signal, any method can be used as a method of generating the second bias signal. For example, a method in which the bias signal generating circuit 47 generates the second bias signal by adding the synchronous detection signal and the dither signal can be used.

When the comparison result of the comparator 10 indicates that the change amount $\Delta V_{peak}$ is larger than the first threshold $Th_{\Delta Vp1}$, the bias signal generating circuit 47 generates a first bias signal maintaining the phase bias φI before the change amount $\Delta V_{peak}$ becomes larger than the first threshold $Th_{\Delta Vp1}$.

In addition, when the comparison result of the comparator 10 indicates that the change amount $\Delta V_{peak}$ is larger than the first threshold $Th_{\Delta Vp1}$, the bias signal generating circuit 47 generates a second bias signal maintaining the phase bias φQ before the change amount $\Delta V_{peak}$ becomes larger than the first threshold $Th_{\Delta Vp1}$.

The bias signal generating circuit 47 outputs the generated first bias signal to the first Mach-Zehnder interferometer 3, and outputs the generated second bias signal to the second Mach-Zehnder interferometer 4.

In a case where the change amount $\Delta V_{peak}$ is larger than the first threshold $Th_{\Delta Vp1}$, there is a possibility that a situation such as a change in the modulation format of the modulation signal has occurred. Therefore, the result of synchronous detection by the synchronous detection circuit 7' becomes temporally discontinuous. As a result, the bias signal generating circuit 47 adjusts each of the phase bias φI indicated by the first bias signal generated in accordance with the synchronous detection signal and the phase bias φQ indicated by the second bias signal generated in accordance with the synchronous detection signal to a wrong direction, and the output signal of the IQ optical modulator 1 may be deteriorated.

However, when the change amount $\Delta V_{peak}$ is larger than the first threshold $Th_{\Delta V_{p1}}$, each of the phase bias φI indicated by the first bias signal generated by the bias signal generating circuit 47 and the phase bias φQ indicated by the second bias signal is the same as the phase bias before the change amount $\Delta V_{peak}$ becomes larger than the first threshold $Th_{\Delta V_{p1}}$. Therefore, it is possible to suppress deterioration of the output signal of the IQ optical modulator 1 due to adjustment of each of the phase bias φI indicated by the first bias signal generated by the bias signal generating circuit 47 and the phase bias φQ indicated by the second bias signal to the wrong direction.

When the comparison result of the comparator 10 indicates that the change amount $\Delta V_{peak}$ is larger than the first threshold $Th_{\Delta V_{p1}}$, the bias signal generating circuit 47 outputs an alarm to the outside of the device.

As a result, the user of the optical transmission device illustrated in FIG. 12 or the external device of the optical transmission device illustrated in FIG. 12 can recognize that the automatic bias control for generating each of the first bias signal and the second bias signal in accordance with the synchronous detection signal output from the synchronous detection circuit 7' is stopped.

After generating each of the first bias signal maintaining the phase bias pi and the second bias signal maintaining the phase bias φQ, the bias signal generating circuit 47 starts processing of receiving an instruction to generate each of the first bias signal and the second bias signal from the outside of the device in accordance with the synchronous detection signal.

When an instruction to generate each of the first bias signal and the second bias signal is given from the outside of the device in accordance with the synchronous detection signal, the bias signal generating circuit 47 stops the output of the alarm and restarts the processing of generating each of the first bias signal and the second bias signal in accordance with the synchronous detection signal.

When an instruction to generate each of the first bias signal and the second bias signal is not given from the outside of the device in accordance with the synchronous detection signal, the bias signal generating circuit 47 continues the processing of receiving instruction without restarting the processing of generating each of the first bias signal and the second bias signal in accordance with the synchronous detection signal.

Note that, when the state is returned from the state in which the phase bias φI and the phase bias φQ are maintained to the state in which each of the first bias signal and the second bias signal is generated in accordance with the synchronous detection signal, the bias signals are sequentially returned from any bias signal among the bias signal generated by the bias signal generating circuit 11, the first bias signal, and the second bias signal.

In the seventh embodiment, the optical transmission device is configured so that the bias signal generating circuit 47 generates each of the first bias signal indicating the phase bias used for phase adjustment by the first Mach-Zehnder interferometer 3 and the second bias signal indicating the phase bias used for phase adjustment by the second Mach-Zehnder interferometer 4 in accordance with the synchronous detection signal output from the synchronous detection circuit 7' when the range of the change is equal to or less than the first threshold, generates the first bias signal maintaining the phase bias before the range of the change becomes larger than the first threshold as the first bias signal when the range of the change is larger than the first threshold, and generates the second bias signal maintaining the phase bias before the range of the change becomes larger than the first threshold as the second bias signal. Therefore, the optical transmission device can suppress the deterioration of the modulated light after the phase adjustment by the IQ optical modulator 1 even if the result of the synchronous detection becomes temporally discontinuous.

Eighth Embodiment

In an eighth embodiment, an optical transmission device including a blocking circuit 62 to block a dither signal provided from a dither signal source 61 to the synchronous detection circuit 7 during burst operation in which output of modulated light from an IQ optical modulator 1 is stopped will be described.

Figure 13:
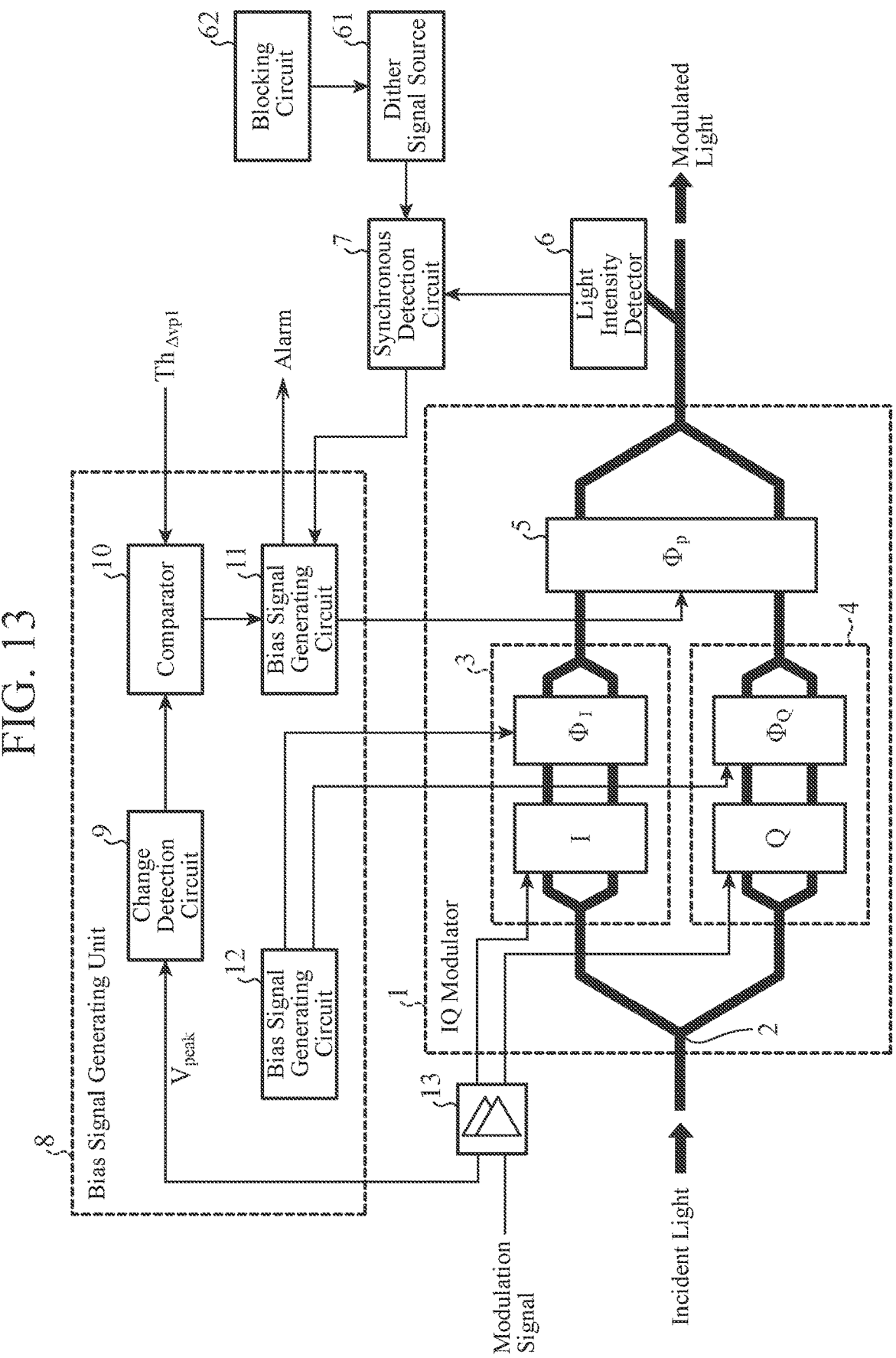
FIG. 13 is a configuration diagram illustrating an optical transmission device according to an eighth embodiment.

FIG. 13 is a configuration diagram illustrating an optical transmission device according to the eighth embodiment. In FIG. 13, the same reference numerals as those in FIG. 1 denote the same or corresponding parts, and thus description thereof is omitted.

The dither signal source 61 is a signal source that outputs the dither signal to the synchronous detection circuit 7.

In the optical transmission device illustrated in FIG. 13, the dither signal source 61 is provided outside the synchronous detection circuit 7. However, this is merely an example, and the dither signal source 61 may be built in the synchronous detection circuit 7.

The blocking circuit 62 blocks the dither signal provided from the dither signal source 61 to the synchronous detection circuit 7 during burst operation in which the output of the modulated light from the IQ optical modulator 1 is stopped.

In the optical transmission device illustrated in FIG. 13, the dither signal source 61 and the blocking circuit 62 are applied to the optical transmission device illustrated in FIG. 1. However, this is merely an example, and the dither signal source 61 and the blocking circuit 62 may be applied to the optical transmission device illustrated in FIG. 4, the optical transmission device illustrated in FIG. 6, the optical transmission device illustrated in FIG. 8, the optical transmission device illustrated in FIG. 10, or the optical transmission device illustrated in FIG. 12.

Next, the operation of the optical transmission device shown in FIG. 13 will be described.

Operations other than the dither signal source 61 and the blocking circuit 62 are similar to those of the optical transmission device illustrated in FIG. 1, and the operations different from those of the optical transmission device illustrated in FIG. 1 will be described.

During burst operation in which the output of the modulated light from the IQ optical modulator 1 is stopped, it is ideal that the modulated light is not output from the IQ optical modulator 1.

However, in a state where the phase bias φI and the phase bias φQ are maintained, when the dither signal is provided from the dither signal source 61 to the synchronous detection circuit 7, modulated light corresponding to the amplitude of the dither signal may be output from the IQ optical modulator 1.

In the optical transmission device illustrated in FIG. 13, during burst operation, the blocking circuit 62 blocks the dither signal provided from the dither signal source 61 to the synchronous detection circuit 7.

When the dither signal provided from the dither signal source 61 to the synchronous detection circuit 7 is blocked, the output of the modulated light from the IQ optical modulator 1 is stopped.

It should be noted that the present disclosure can freely combine the embodiments, modify any constituent element of each embodiment, or omit any constituent element in each embodiment within the scope of the invention.

INDUSTRIAL APPLICABILITY

The present disclosure is suitable for an optical transmission device including a quadrature optical modulator.

REFERENCE SIGNS LIST

1: IQ optical modulator, 1-1: first IQ optical modulator, 1-2: second IQ optical modulator, 2: branch portion, 3: first Mach-Zehnder interferometer, 4: second Mach-Zehnder interferometer, 5: phase adjustment electrode unit, 6: light intensity detector, 7, 7': synchronous detection circuit, 8: bias signal generating unit, 9: change detection circuit, 10: comparator, 11: bias signal generating circuit, 12: bias signal generating circuit, 13: driver, 14: bias signal generating unit, 15: comparator, 16: bias signal generating circuit, 21: memory, 22: processor, 30: bias signal generating unit, 31: first comparator, 32: second comparator, 33: bias signal generating circuit, 34: bias signal generating unit, 35: first comparator, 36: second comparator, 37: bias signal generating circuit, 41: second light intensity detector, 42: third light intensity detector, 43: second synchronous detection circuit, 44, 46: bias signal generating unit, 45, 47: bias signal generating circuit, 51: branch portion, 52: multiplexing portion, 53: light intensity detector, 54: synchronous detection circuit, 55: bias signal generating unit, 56: bias signal generating circuit, 57: bias signal generating circuit, 61: dither signal source, 62: blocking circuit

The invention claimed is:
1. An optical transmission device comprising:
a quadrature optical modulator to modulate incident light with a modulation signal, adjust a phase of modulated light that is the light after the modulation with a phase bias indicated by a bias signal, and output the modulated light after the phase adjustment, or adjust a phase of the incident light with the phase bias indicated by the bias signal, modulate the light after the phase adjustment with the modulation signal, and output the modulated light that is the light after the modulation;
a light intensity detector to detect light intensity of modulated light output from the quadrature optical modulator;
a synchronous detection circuit to perform synchronous detection of a light intensity signal indicating light intensity detected by the light intensity detector and a dither signal, and output a synchronous detection signal indicating a result of the synchronous detection; and
a bias signal generator to monitor a change in amplitude of the modulation signal, generate the bias signal in accordance with the synchronous detection signal output from the synchronous detection circuit when a range of the change is equal to or less than a first threshold, and generate a bias signal maintaining a phase bias before the range of the change becomes larger than the first threshold as the bias signal when the range of the change is larger than the first threshold.

2. The optical transmission device according to claim 1, wherein
the bias signal generator includes:
a change detection circuit to detect a change in amplitude of the modulation signal;
a comparator to compare a range of the change detected by the change detection circuit with the first threshold; and
a bias signal generating circuit to generate the bias signal in accordance with the synchronous detection signal output from the synchronous detection circuit when a comparison result of the comparator indicates that the range of the change is equal to or less than the first threshold, and generate a bias signal maintaining a phase bias before the range of the change becomes larger than the first threshold as the bias signal when a comparison result of the comparator indicates that the range of the change is larger than the first threshold.

3. The optical transmission device according to claim 1, wherein
the bias signal generator includes:
a first comparator to compare an amplitude of the modulation signal with an amplitude lower limit value;
a second comparator to compare an amplitude of the modulation signal with an amplitude upper limit value larger than the amplitude lower limit value by the first threshold; and
a bias signal generating circuit to generate the bias signal in accordance with the synchronous detection signal output from the synchronous detection circuit when a comparison result of the first comparator indicates that the amplitude of the modulation signal is equal to or more than the amplitude lower limit value, and a comparison result of the second comparator indicates that the amplitude of the modulation signal is equal to or less than the amplitude upper limit value, generate a bias signal maintaining a phase bias before the amplitude of the modulation signal becomes smaller than the amplitude lower limit value as the bias signal when it is indicated that the amplitude of the modulation signal is smaller than the amplitude lower limit value, and generate a bias signal maintaining the phase bias before the amplitude of the modulation signal becomes larger than the amplitude upper limit value as the bias signal when the comparison result of the second comparator indicates that the amplitude of the modulation signal is larger than the amplitude upper limit value.

4. The optical transmission device according to claim 1, wherein the bias signal generator outputs an alarm when the range of the change is larger than the first threshold.

5. The optical transmission device according to claim 1, wherein after generating a bias signal maintaining a phase bias before the range of the change becomes larger than the first threshold, when an instruction to generate the bias signal is given from the outside of the device in accordance with the synchronous detection signal, the bias signal generator resumes processing of generating the bias signal in accordance with the synchronous detection signal.

6. The optical transmission device according to claim 1, wherein the bias signal generator monitors a change in amplitude of the modulation signal after generating a bias signal maintaining a phase bias before the range of the change becomes larger than the first threshold, and resumes processing of generating the bias signal in accordance with the synchronous detection signal when the range of the change is smaller than a second threshold.

7. The optical transmission device according to claim 1, further comprising a blocking circuit to block a dither signal provided from a dither signal source to the synchronous detection circuit during burst operation in which output of modulated light from the quadrature optical modulator is stopped.

8. The optical transmission device according to claim 1, wherein
the quadrature optical modulator includes:
a branch portion to branch the incident light into two;
a first Mach-Zehnder interferometer to modulate one of two light beams branched by the branch portion with the modulation signal, adjust a phase of a modulated light beam that is the light beam after the modulation, and output the modulated light beam after the phase adjustment, or adjust a phase of the one of two light beams, modulate the light beam after the phase adjustment with the modulation signal, and output the modulated light beam that is the light beam after the modulation;
a second Mach-Zehnder interferometer to modulate the other of two light beams branched by the branch portion with the modulation signal, adjust a phase of a modulated light beam that is the light beam after the modulation, and output the modulated light beam after the phase adjustment, or adjust a phase of the other light beam, modulate the light beam after the phase adjustment with the modulation signal, and output the modulated light beam that is the light beam after the modulation; and
a phase adjustment electrode to adjust a phase of the modulated light beam output from the first Mach-Zehnder interferometer and a phase of the modulated light beam output from the second Mach-Zehnder interferometer with a phase bias indicated by the bias signal, and multiplex two modulated light beams after the phase adjustment with the phase bias.

9. The optical transmission device according to claim 8, wherein
the light intensity detector detects light intensity of modulated light after multiplexing by the phase adjustment electrode,
the synchronous detection circuit performs synchronous detection of a light intensity signal indicating a light intensity detected by the light intensity detector and a dither signal, and outputs a synchronous detection signal indicating a result of the synchronous detection, and
the bias signal generator monitors a change in amplitude of the modulation signal, generates a bias signal indicating a phase bias used for phase adjustment by the phase adjustment electrode in accordance with the synchronous detection signal output from the synchronous detection circuit as the bias signal when the range of the change is equal to or less than a first threshold, and generates a bias signal maintaining a phase bias before the range of the change becomes larger than the first threshold as the bias signal when the range of the change is larger than the first threshold.

10. The optical transmission device according to claim 9, wherein
the light intensity detector is a first light intensity detector, and the synchronous detection circuit is a first synchronous detection circuit,
the optical transmission device includes:
a second light intensity detector to detect light intensity of modulated light output from the first Mach-Zehnder interferometer;
a third light intensity detector to detect light intensity of modulated light output from the second Mach-Zehnder interferometer; and
a second synchronous detection circuit to perform synchronous detection of a light intensity signal indicating a light intensity detected by the second light intensity detector and a dither signal, output a first synchronous detection signal indicating a result of the synchronous detection, perform synchronous detection of a light intensity signal indicating a light intensity detected by the third light intensity detector and a dither signal, and output a second synchronous detection signal indicating a result of the synchronous detection, and
the bias signal generator generates a first bias signal indicating a phase bias used for phase adjustment by the first Mach-Zehnder interferometer in accordance with a first synchronous detection signal output from the second synchronous detection circuit, and generates a second bias signal indicating a phase bias used for phase adjustment by the second Mach-Zehnder interferometer in accordance with a second synchronous detection signal output from the second synchronous detection circuit when a range of the change is equal to or less than a first threshold, and generates a first bias signal maintaining a phase bias before the range of the change becomes larger than the first threshold as the first bias signal, and generates a second bias signal maintaining a phase bias before the range of the change becomes larger than the first threshold when the range of the change is larger than the first threshold.

11. The optical transmission device according to claim 9, wherein the bias signal generator monitors a change in amplitude of the modulation signal, generates a first bias signal indicating a phase bias used for phase adjustment by the first Mach-Zehnder interferometer and a second bias signal indicating a phase bias used for phase adjustment by the second Mach-Zehnder interferometer in accordance with the synchronous detection signal output from the synchronous detection circuit when the range of the change is equal to or less than a first threshold, generates a first bias signal maintaining a phase bias before the range of the change becomes larger than the first threshold as the first bias signal, and generates a second bias signal maintaining a phase bias before the range of the change becomes larger than the first threshold as the second bias signal when the range of the change is larger than the first threshold.

12. An optical transmission device comprising:
a branch portion to branch incident light into two;
a first quadrature optical modulator to modulate one of two light beams branched by the branch portion with a modulation signal, adjust a phase of a modulated light beam that is the light beam after the modulation with a phase bias indicated by a bias signal, and output the modulated light beam after the phase adjustment, or adjust a phase of the one of two light beams with a phase bias indicated by the bias signal, modulate the light beam after the phase adjustment with the modulation signal, and output the modulated light beam that is the light beam after the modulation,
a second quadrature optical modulator to modulate the other of two light beams branched by the branch portion with the modulation signal, adjust a phase of a modulated light beam that is the light beam after the modulation with a phase bias indicated by the bias signal, and output the modulated light beam after the phase adjustment, or adjust a phase of the other light beam with a phase bias indicated by the bias signal, modulate the light beam after the phase adjustment with the modulation signal, and output the modulated light beam that is the light beam after the modulation;

a multiplexer to multiplex a modulated light beam output from the first quadrature optical modulator and a modulated light beam output from the second quadrature optical modulator;

a light intensity detector to detect a light intensity of modulated light after multiplexing by the multiplexer;

a synchronous detection circuit to perform synchronous detection of a light intensity signal indicating light intensity detected by the light intensity detector and a dither signal, and output a synchronous detection signal indicating a result of the synchronous detection; and a bias signal generator to monitor a change in amplitude of the modulation signal, generate the bias signal in accordance with the synchronous detection signal output from the synchronous detection circuit when the range of the change is equal to or less than a first threshold, and generate a bias signal maintaining a phase bias before the range of the change becomes larger than the first threshold as the bias signal when the range of the change is larger than the first threshold.

\* \* \* \* \*